(12) United States Patent
Stevenson et al.

(10) Patent No.: US 9,579,612 B2
(45) Date of Patent: Feb. 28, 2017

(54) WINE BOTTLE AERATOR

(71) Applicants: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US)

(72) Inventors: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US)

( * ) Notice: Subject to any disclaimer, the term of this patent is extended or adjusted under 35 U.S.C. 154(b) by 0 days.

(21) Appl. No.: 15/089,584

(22) Filed: Apr. 3, 2016

(65) Prior Publication Data

US 2016/0214071 A1    Jul. 28, 2016

Related U.S. Application Data

(63) Continuation-in-part of application No. 14/294,157, filed on Jun. 3, 2014, now Pat. No. 9,321,019.

(51) Int. Cl.

| | |
|---|---|
| *B01F 3/04* | (2006.01) |
| *B01F 15/02* | (2006.01) |
| *B01F 5/06* | (2006.01) |
| *C12G 1/00* | (2006.01) |
| *B01F 13/00* | (2006.01) |

(Continued)

(52) U.S. Cl.
CPC ...... *B01F 3/04794* (2013.01); *B01F 3/04241* (2013.01); *B01F 3/04262* (2013.01); *B01F 3/04801* (2013.01); *B01F 5/0693* (2013.01); *B01F 13/002* (2013.01); *B01F 15/0243* (2013.01); *C12G 1/00* (2013.01); *C12H 1/14* (2013.01); *B01F 2003/049* (2013.01); *B01F 2003/04865* (2013.01); *B01F 2003/04872* (2013.01); *B01F 2003/04879* (2013.01);

(Continued)

(58) Field of Classification Search
CPC .... B01F 3/04; B01F 3/04099; B01F 3/04106; B01F 3/04241; B01F 3/04262; B01F 3/04787; B01F 3/04794
USPC ............. 261/30, 77, 119.1, 121.1, 124, 126; 99/323.1; 426/477
See application file for complete search history.

(56) References Cited

U.S. PATENT DOCUMENTS

| | | |
|---|---|---|
| 2,408,306 A | 4/1944 | Flournoy |
| 3,309,067 A | 3/1967 | Brewster |

(Continued)

*Primary Examiner* — Robert A Hopkins
(74) *Attorney, Agent, or Firm* — Hackler Daghighian Martino & Novak

(57) ABSTRACT

A wine aerator includes a gas conduit having a proximal end in fluid communication with a distal end, wherein the gas conduit passes through a seal and wherein the distal end is configured to be insertable into an inside of an uncorked wine bottle. A gas source is connectable to the proximal end of the gas conduit and is in fluidic communication with the gas conduit, wherein the gas source comprises an air pump having an adjustable flow rate of at least 0.1 liters per minute up to a maximum of 20 liters per minute. A bubble-generating aeration element is disposed at the distal end of the gas conduit and in fluidic communication with the gas conduit. The bubble-generating aeration element comprises a porous material having an average pore size of at least 1 micron up to a maximum of 500 microns.

20 Claims, 42 Drawing Sheets

(51) Int. Cl.
*C12H 1/14* (2006.01)
*B01F 15/00* (2006.01)

(52) U.S. Cl.
CPC ........... *B01F 2015/00084* (2013.01); *B01F 2215/0072* (2013.01)

(56) References Cited

U.S. PATENT DOCUMENTS

| | | | |
|---|---|---|---|
| 4,494,452 A * | 1/1985 | Barzso | B01F 3/04794 261/122.1 |
| 4,763,803 A | 8/1988 | Schneider | |
| 4,785,724 A | 11/1988 | Vassallo | |
| 5,154,112 A | 10/1992 | Wettern | |
| 5,595,104 A | 1/1997 | Delaplaine | |
| 6,568,660 B1 | 5/2003 | Flanbaum | |
| 8,561,970 B1 | 10/2013 | Mills et al. | |
| D701,080 S | 3/2014 | Mills et al. | |
| D701,081 S | 3/2014 | Mills et al. | |
| D705,004 S | 5/2014 | Mills et al. | |
| D716,612 S | 11/2014 | Mills et al. | |
| 9,168,495 B2 | 10/2015 | Connors | |
| 9,321,018 B2 | 4/2016 | Connors | |
| 9,321,019 B2 | 4/2016 | Stevenson et al. | |

\* cited by examiner

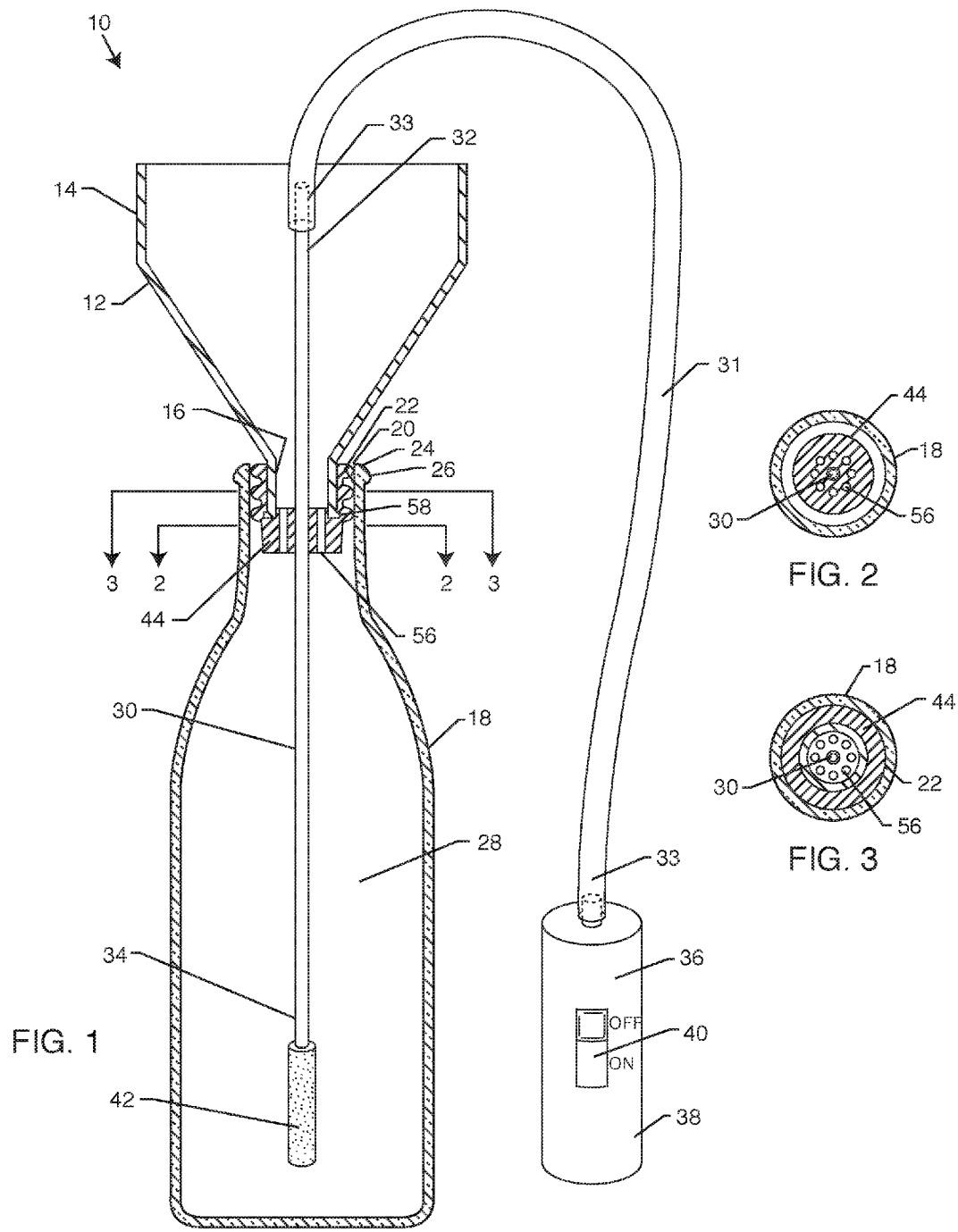

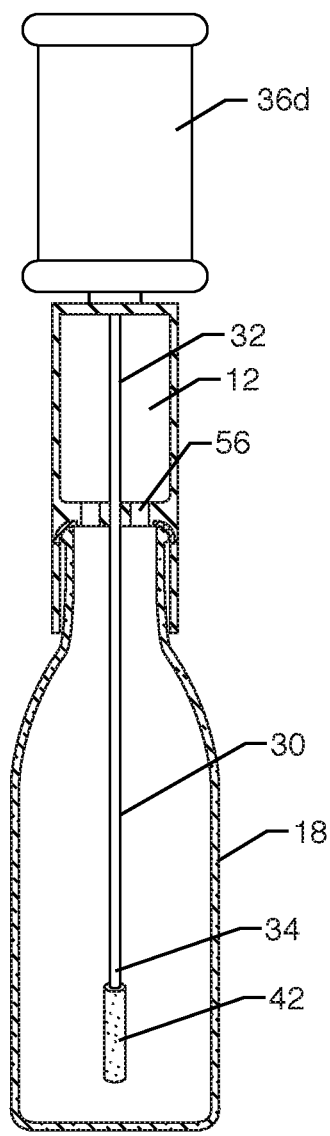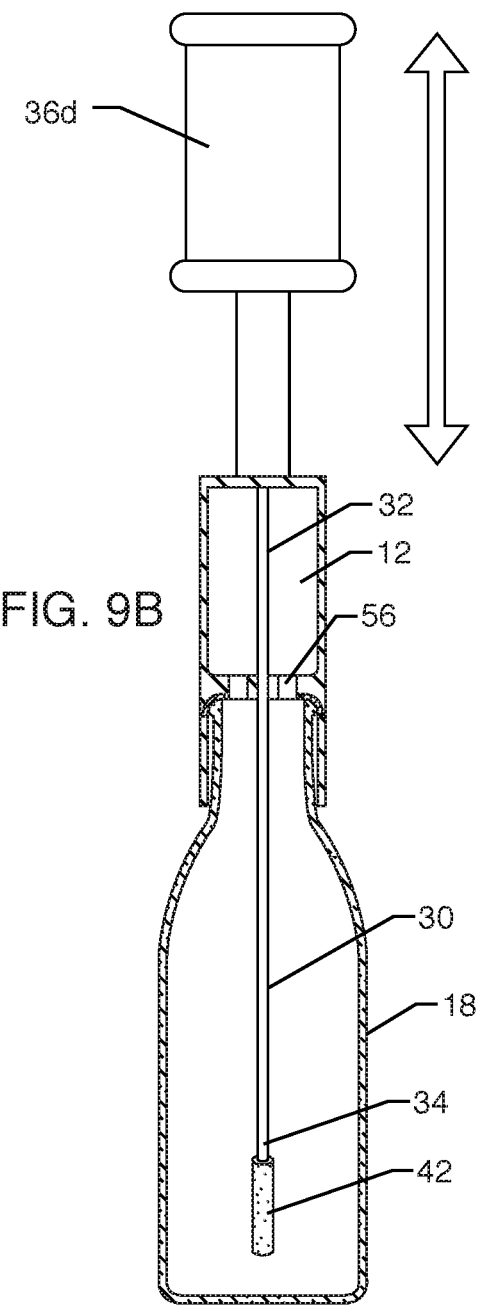

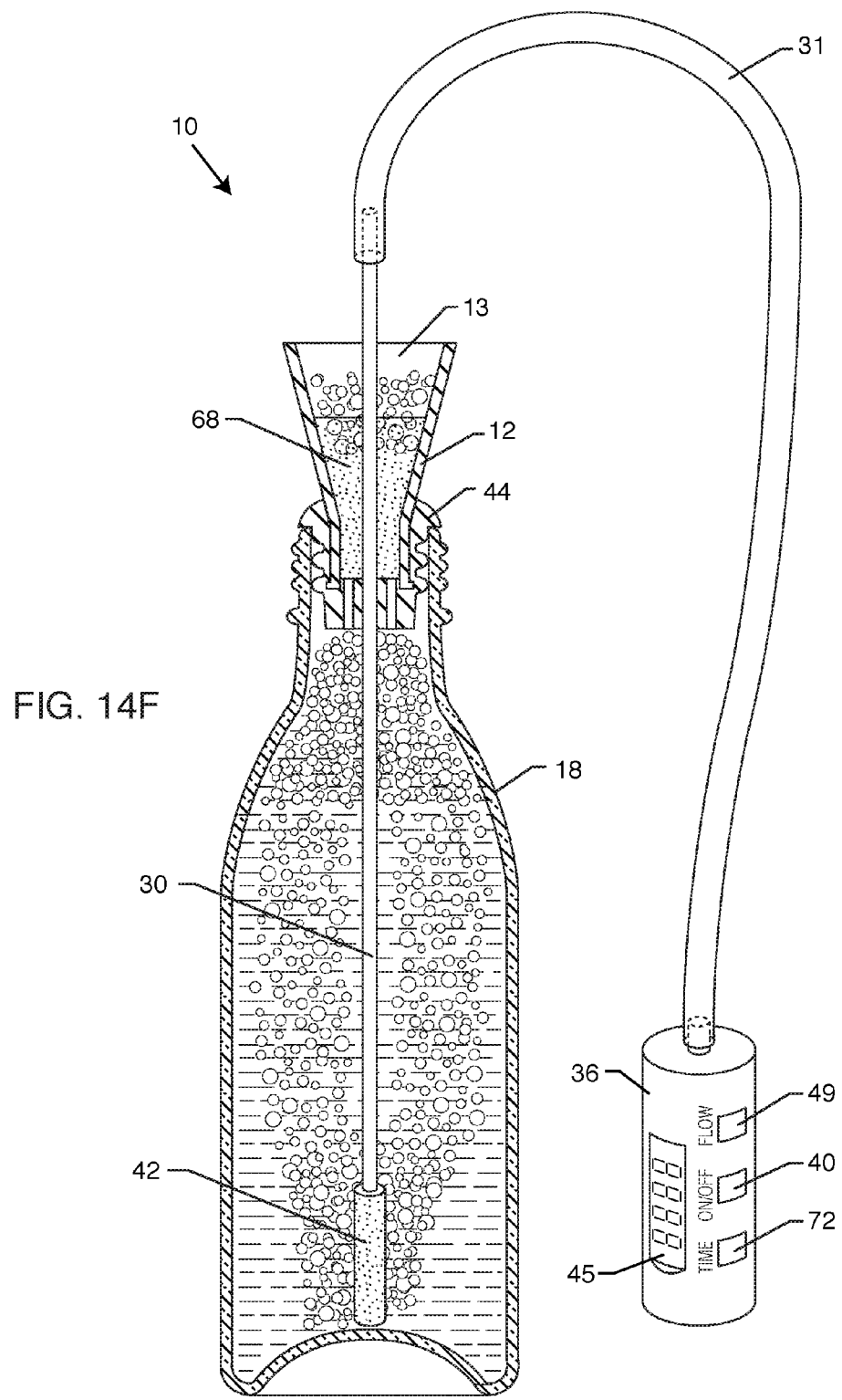

WINE BOTTLE AERATOR

CROSS-REFERENCE TO RELATED APPLICATIONS

This continuation-in-part application claims priority to application Ser. No. 14/294,157 filed on Jun. 3, 2014 now U.S. Pat. No. 9,321,019, the contents of which are fully incorporated herein with this reference.

DESCRIPTION

Field of the Invention

The present invention generally relates to aeration of wine. More particularly, the present invention relates to devices that aerates wine in a wine glass, bottle or other container at an accelerated rate through the expansion and control of aeration bubbles.

Background of the Invention

Decanting of red wine has been a long tradition in the wine industry. In decanting, the wine is simply poured into another container, usually one of clear glass or crystal. Decanting is particularly important for most young red wines (between three to ten years old). These younger wines can be harsh or astringent if consumed directly after opening the bottle. Such wines have this harsh character because red wine has been maintained in a relatively oxygen-free environment during aging in a bottle. Over time, this environment results in a closed character for the beverages that is derived from the accumulation of particular aroma compounds. A wine's aroma will change during the first ten to thirty minutes after the bottle is opened. Decanting accelerates the breathing process, which increases the wine's aromas from natural fruit and oak by allowing a few volatile substances to evaporate. Decanting also softens the taste of tannins that cause harshness and astringency in young wines. In older red wines, the tannin reactions have proceeded long enough to reduce astringency. As a result, the taste is not as harsh when the wine is drunk straight out of the bottle. In comparison to reds, white wines have little tannin and are not aged in bottles for very long before serving. Thus, they have very little opportunity to develop bottle aromas that need evaporation. Instead, their natural fruit aromas more specifically define their taste. There are however, a number of white wines that can benefit from decanting, or specifically aeration.

In the past, it was quite common for wines poured from both barrel and bottle to contain a considerable amount of solid matter (i.e. sediments). However, most wines on the shelves today have gone through a filtering process and are substantially clear. Certain high end wines, particularly after long term storage, can still have substantial sediments. Decanting a young wine (particularly one with no sediment) involves pouring the wine into another decanter and letting it sit for twenty minutes or so before you serve it and you will likely notice a dramatic increase in subtlety and complexity. If you have the luxury of time, one can continue tasting the wine over a period of hours. Many wines keep evolving and improving over time. Some experts believe that decanting all types of wines from Bordeaux to Burgundy and even whites can beneficially affect the wine.

Of course the problem with decanting is that it takes a substantially long period of time for the oxygen to work its miraculous effects on the taste of the wine. If one knows, for example, a day in advance that they are going to be having a meal with a particular type of wine, the wine may be uncorked and decanted as much as a day before. Some experts have recommended the following process for properly drinking a bottle of red wine: First, chill the red wine in a refrigerator for at least two hours. Second, uncork the bottle of wine and decant it. Allow it to come back to room temperature over a period of hours. Third, taste and then drink the wine. The process of warming back up tends to pull more oxygen in from the surrounding air thereby refining the wine. The inventors have actually done this process and it works amazingly well. The downside is that is very time consuming.

However, all of this historical decanting and ritual that one goes through with wine (particularly red wine) ignores the simple physics. It is really only the act of pouring the wine from one bottle to a different container that has any real meaningful effect as this is when surface tension is broken up and oxygen from the surrounding air actually has a chance to interact with wine molecules. Once the wine is decanted and sitting again in a calm state, there is a surface tension across the surface of the fluid thereby making gas exchange a very slow and long process.

Accordingly, there is a need to rapidly aerate wine and perfect an oxygen exchange to remove the astringent taste and reduce the tannin levels. U.S. Pat. No. 4,785,724 to Vassallo describes an apparatus for aerating bottled wine. Referring to FIG. 1 of Vassallo, one can see a wine bottle 1 which is full of wine and an aeration tube 20, 21 disposed into the bottle of wine terminating at a distal end 22 in a structure with fine holes to break up the air flow into final bubbles. The problem with the Vassallo invention is that the air flow rate through the tube 20, 21 has to be extremely low so that the wine does not form bubbles and froth out the top and create a mess all over the base unit 2. The inventors have experimented with such techniques and have found that this is no more efficient than decanting. In other words, it can take up to 20 minutes by very slowly putting bubbles into the wine and creating a slight surface agitation such that the wine will not froth out of the bottle.

Reference is also made to U.S. Pat. No. 5,154,112 to Wettern. In the Wettern invention, there is a manual pump disposed over the top of the wine bottle which one manually compresses. Referring to FIGS. 1 and 2 of the '112 patent, one can see the end of the pump 8 and a seating collar 13 where it sits on the neck of the wine bottle. Referring to FIG. 2, one can see the manual pump in cross-section and one can see the area 13 and note that there is not a liquid tight seal formed. This means that as air is injected down into the wine bottle, as shown in FIG. 1, it would have to be an extremely low flow rate. If a bubble froth was formed, that would mean that liquid and bubbles would escape between the neck of the wine bottle and the collar 13 which only loosely rests on the end of the wine bottle. This is a major deficiency of the invention as previously described in the Vassallo '724 patent. In other words, the Wettern invention would only work at extremely low flow rates.

Another wine bottle aerator is described in U.S. Pat. No. 5,595,104 to Delaplaine. FIG. 1 of Delaplaine shows an air pump housing 12, a sealing apparatus 14, an extension tube 16 and an end with aeration holes 18. There is an air escape hole 24, as shown. The '104 patent suffers from all of the same deficiencies as described in the Vassallo and Wettern patents. The deficiency is the air flow out of the distal tip 18 would have to be extremely low such that a bubble and froth wasn't created, which would cause wine to overflow the outside of the wine bottle and pour, for example, down onto a countertop.

U.S. Pat. No. 8,561,970 to Mills, et al. describes another type of low volume aeration system. The Mills, et al.

aeration system does not have an expansion chamber and is therefore, by definition a low volume system. This is in marked contrast to the present invention, which is a high volume aeration system able to achieve complete aeration and reduction of tannins in the wine in less than 10 seconds or some specific time period much shorter than the prior art. All of the aforementioned prior art requires at least several minutes of aeration at a very slow rate. The reason for this is simple physics. If one drives a very high volume of gas, such as air or oxygen into the bottle of a bottle of wine, a great deal of bubble formation and froth will immediately occur. Unless there is an expansion chamber, this froth will spill over the top of the wine bottle and create a mess.

Accordingly, there is a need for a device that can aerate wine at an accelerated rate. The present invention fulfills these needs and provides other related advantages.

SUMMARY OF THE INVENTION

An exemplary embodiment of a wine aerator includes a seal configured to engage an opening of an uncorked wine bottle separating an inside of the uncorked wine bottle from an outside of the uncorked wine bottle. A gas conduit has a proximal end in fluid communication with a distal end, wherein the gas conduit passes through the seal and wherein the distal end is configured to be insertable into the inside of the uncorked wine bottle. A gas source is connectable to the proximal end of the gas conduit and is in fluidic communication with the gas conduit, wherein the gas source comprises an air pump having an adjustable flow rate of at least 0.1 liters per minute up to a maximum of 20 liters per minute. A bubble-generating aeration element is disposed at the distal end of the gas conduit and in fluidic communication with the gas conduit. The bubble-generating aeration element comprises a porous material having an average pore size of at least 1 micron up to a maximum of 500 microns. At least one aperture is disposed through the seal, the at least one aperture configured to be in fluidic communication with the inside and outside of the uncorked wine bottle when the seal is engaged with the opening of the uncorked wine bottle.

In other exemplary embodiments, the average pore size of the bubble-generating aeration element may be at least 5 microns up to a maximum of 200 microns, or the average pore size of the bubble-generating aeration element may be at least 10 microns up to a maximum of 100 microns.

The air pump may have an adjustable flow rate of at least 1 liters per minute up to a maximum of 10 liters per minute, or the air pump may have an adjustable flow rate of at least 1 liters per minute up to a maximum of 5 liters per minute.

The porous material of the bubble-generating aeration element may consist of a polymer, wherein the polymer may be polyethylene, and the polyethylene may comprises a food-grade, binder-free polyethylene.

When the seal is engaged with the opening of the uncorked wine bottle the gas source may be configured to provide a gas flow through the proximal end of the gas conduit, through the distal end of the gas conduit, through the bubble-generating aeration element, through the inside of the uncorked wine bottle and through the at least one aperture.

The seal may be configured to seal against an inside surface, a top surface and/or an outside surface of the opening of the uncorked wine bottle, and wherein the seal may comprise an elastic or rubber-like material.

The gas source may comprise an electrically powered air pump, wherein the electrically powered air pump may be electrically powered by a battery and/or by an electrical plug.

The electrically powered air pump may comprise of an electronic display and/or a LED display, where the electrically powered air pump may comprise at least one button configured to control the electrically powered air pump.

The gas source may be disposed remote from the seal.

The gas source may be attached to a portion of the seal or wherein the gas source may be attached to a housing that is then attached to the seal.

The gas conduit may comprise a bent distal end disposing the bubble-generating aeration element perpendicular to the proximal end of the gas conduit. The gas conduit comprises a resilient and flexible material preformed into the bent distal end.

The gas conduit may pass through the at least one aperture and the gas conduit may not be attached to the at least one aperture.

A housing may be attached to seal wherein the housing extends below the seal to a contoured distal end, wherein the gas conduit may be configured to move within the housing and seal thereby extending the bubble-generating aeration element beyond the contoured distal end of the housing.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a sectional side view of an exemplary embodiment of an aerator of the present invention;

FIG. 2 is a sectional view taken from lines 2-2 from the structure of FIG. 1;

FIG. 3 is a sectional view taken from lines 3-3 from the structure of FIG. 1;

FIG. 9A is a sectional view of another embodiment of an aerator with a manual air pump in the down position;

FIG. 9B is the structure of FIG. 9A now showing the manual air pump in the up position;

FIG. 14F is a view similar to FIG. 14D, now with a new embodiment of a button layout with the digital display integrated into the air pump;

DETAILED DESCRIPTION OF THE PREFERRED EMBODIMENTS

Figure 4:
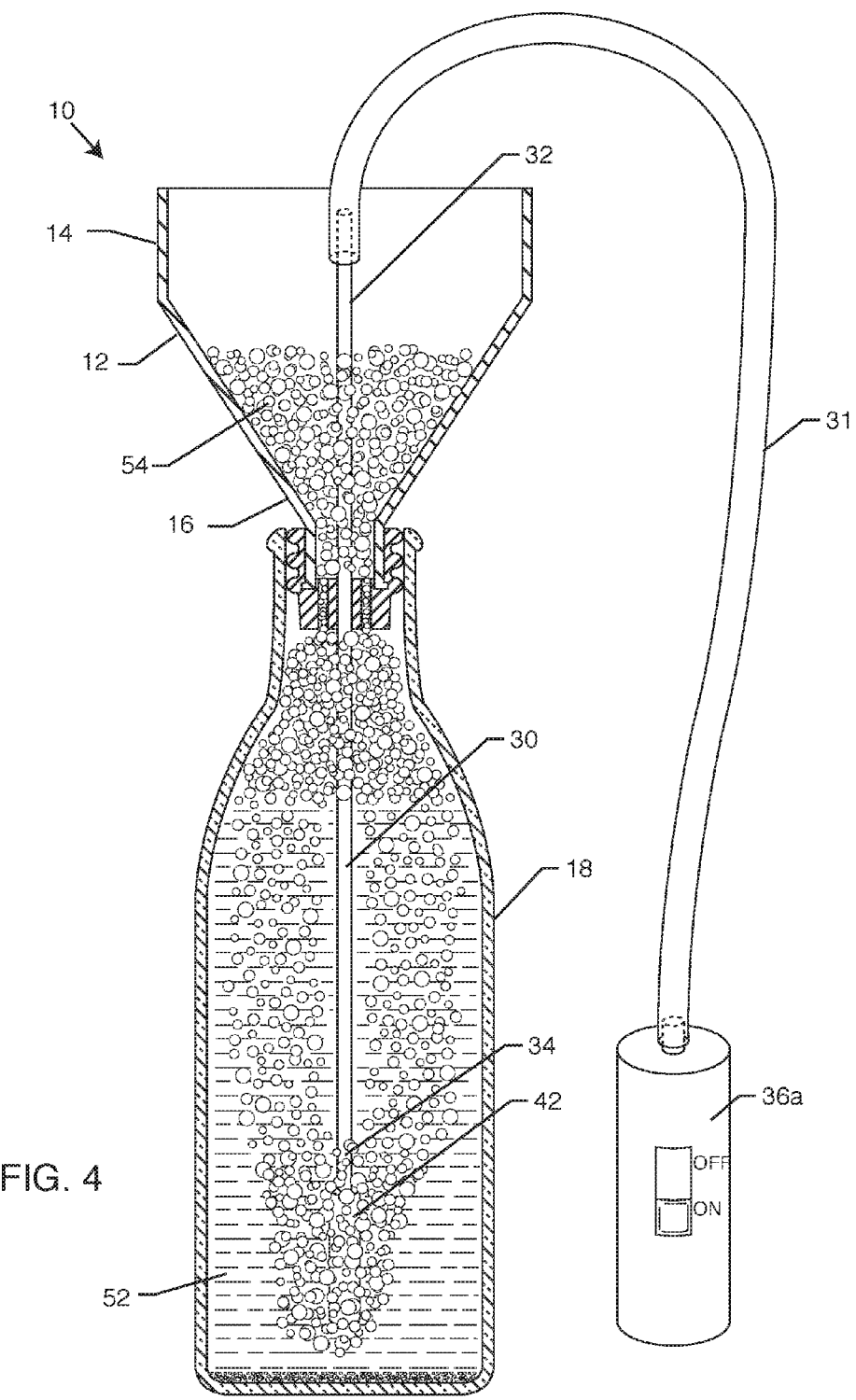
FIG. 4 is a sectional view similar to FIG. 1 now showing wine being aerated and expanding into an expansion chamber.

FIG. 1 illustrates a cross-section of a wine bottle 18 with an aerator 10 of the present invention. Most wine bottles 18 are a standard 750 ml. However, there are magnum bottles and even super magnum bottles, which may have different neck sizes. Shown, is an expansion chamber 12 in accordance with the present invention. The expansion chamber 12 has a top portion 14 and a bottom portion 16 which is necked down to fit into the opening 20 of the bottle 18. A sealing element 44, such as a rubber seal, is shown such that fluid and or bubbles cannot escape and flow down the outside of the wine bottle 18. As shown here, the sealing element 44 is in contact with an inside surface 22 of the bottle opening 20. A sealing element 44 could also be configured to seal to a top surface 24 of the bottle opening 20 or to an outside surface 26 of the bottle opening 20.

Figure 8:
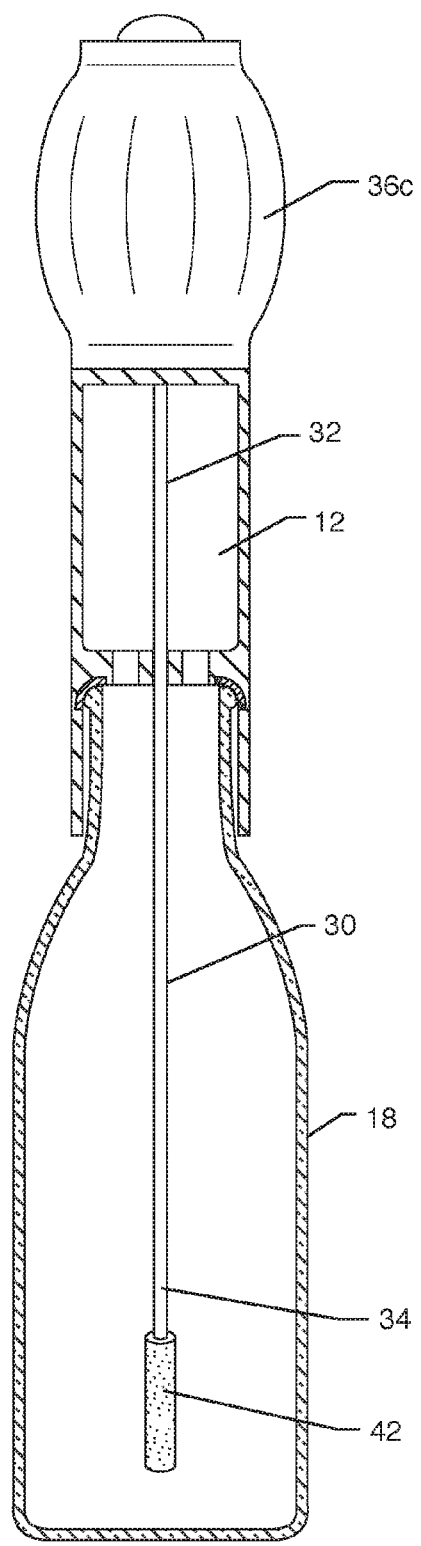
FIG. 8 is a sectional view of another embodiment of an aerator with a manual air pump.

There is a gas source 36 shown, which may be an air pump 36a (FIG. 4), a compressed air source 36b (FIG. 4A) (a compressed oxygen source or CO2 source) or a manual air pump 36c (FIGS. 8, 9A, 9B). Shown here is an on/off switch 40. In this particular embodiment, the gas source 36 is a self-contained air pump and has an internal battery 38 or could be connected to an electrical outlet via an electrical cable and plug (not shown). The gas flow is directed through gas conduit 30 from the proximal end 32 to the distal end 34. Shown here the air conduit 30 has a flexible extension 31 that allows the gas source 36 to be placed remotely from the expansion chamber 12 and bottle 18. For the sake of simplifying the figures, the gas conduit 31 is typically shown in a simplified manner without a wall thickness, but does in fact have a wall thickness as is understood by those skilled in the art.

At the distal end 34 of the gas conduit 30 is a fine aeration element 42. This aeration element 42 could be constructed of a stainless steel cylinder with multiple small perforations, or an alcohol-resistant stone structure such that micro-bubbles are formed at a high flow rate.

As gas pressure is introduced into an inside 28 of the bottle 18 as best seen in FIG. 4, the pressure on the inside 28 of the bottle 18 will tend to increase along with the formation of a large amount of froth and bubbles 54 from the wine 52. Passageways 56 (FIGS. 2 and 3) allow these bubbles and froth to collect on the inside of the expansion chamber 12. This process is so fast that several inches of froth will develop in just a few seconds. Referring once again to sealing element 44, one will see that it has a catch 58 which is part of the expansion chamber 12 so that the rubber stopper/sealing element 44 will not easily or mistakenly slide off.

Figure 4A:
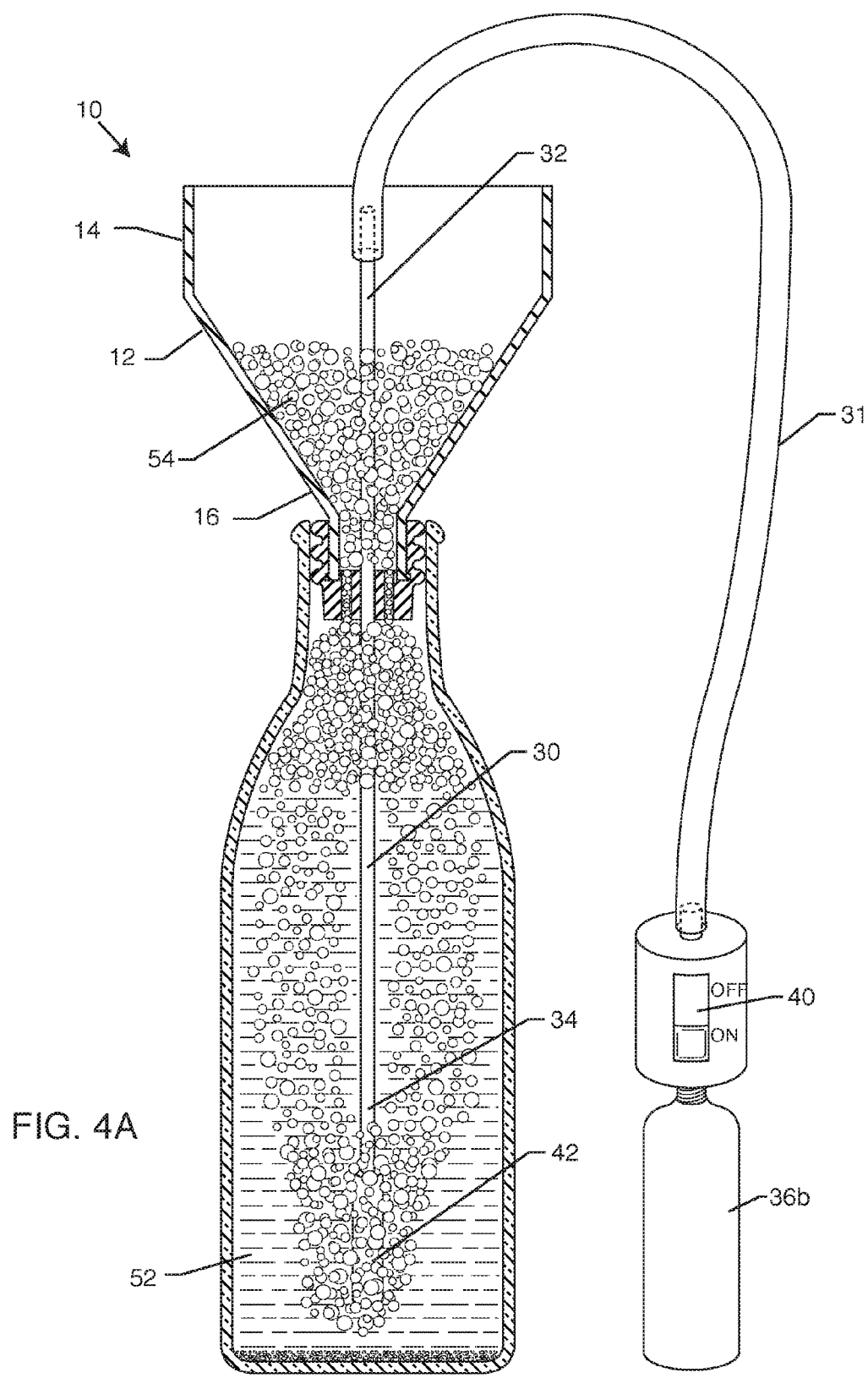
FIG. 4A is a view similar to FIG. 4, where now the gas source is a compressed gas canister.

Referring once again to the gas source 36, it can be a self-contained battery operated air pump or use electrical cord (not shown). As another embodiment of the gas source 36, it could even be a self-contained compressed gas source 36b as best shown in FIG. 4A. The compressed gas source 36b could be a CO2 canister, compressed air canister or compressed oxygen canister. The canister can be screwed into or connected to the switch 40.

Referring once again to FIG. 1, the expansion chamber 12 could be made of many different materials. In a preferred embodiment, the expansion chamber 12 would be translucent so one could enjoy the effect of watching the wine 52 froth build up and then dissipate back down into the bottle 18. Of course, this could also be stainless steel, plastic or any other material suitable material. In one preferred embodiment, this would be of a crystalline glass structure and can even be etched with some grapes or other ornamentation.

Referring again to FIG. 1, the tubing material 31, in a preferred embodiment, would be a clear type of surgical or food-grade tubing. It would have a slip-fit 33 onto the end of the rigid proximal end 32 of the gas conduit 30. At the distal end 34 of the gas conduit 30 would be the aeration element 42. The gas conduit itself 34 could be of glass, stainless steel, or the like. In a preferred embodiment, the material would be stainless steel to provide mechanical strength. It is also noted herein that the gas conduit 30 is preferred to be rigid, but could also be a flexible gas conduit 30 as well.

FIGS. 2 and 3 are taken from FIG. 1 and show how the sealing element 44 functions. In FIG. 2, on can see the passageways 56 through the sealing element 44 that connect the expansion chamber 12 and the inside 28 of the bottle 18 in fluid communication. Also seen is the air conduit 30 passing there through. FIG. 3 shows how the sealing element 44 is sealed against the inside surface 22 of the bottle 18.

FIG. 4 dramatically illustrates one difference in the present invention over all of the other prior art. As one can see, the volume of gas flow injected at or near the bottom of the wine bottle 18 is extremely high producing a huge bubble formation and froth 54, which is temporarily collected in the expansion chamber 12. This whole process is amazingly quick. The inventors have demonstrated that all it takes to completely remove the tannins and astringent properties of a wine 52 is just a few seconds of high volume bubbling like this. This is in stark contrast with all of the other prior art where the bubble formation is so low it will not overflow the container. The flow rates of the present invention tend to be at least an order or magnitude greater than the prior art. The inventors have done a set of very interesting experiments using the configuration shown in FIG. 4. These experiments have been performed by pinching down the flexible extension tube 31, wherein, no expansion chamber 12 was used. In other words, the inventors wanted to see if a very small amount of air bubble formation could be produced, such that the wine would not overflow the top of the wine bottle. This was found to be the case. By reducing the air flow down to a relatively miniscule amount (less than 0.1 liters per minute), the bubble formation 54 can be reduced to the point where the bubbles do not overflow the top of the wine bottle 18. However, experimentation has shown that one must do this for at least several minutes to properly aerate the wine and as much as 10 to 20 minutes, or in some cases hours. This makes this pinching technique hardly any more efficient than the old method of decanting.

Again, in the present invention, there is such a huge bubble formation that occurs in just a few seconds that tremendous surface area is created which is then captured and contained by the expansion chamber 12. Surface area is created around the outside of each bubble that's formed in the expansion chamber 12 and also the inside of each bubble. In other words, gas or air is in contact with an enormous surface area of the wine 52. Double blinded testing in large groups of people has repeatedly shown that the high volume approach has a remarkable effect on the aroma, taste, and reduction of tannins of almost all wines. The present invention is so effective, it also removes astringency from any white wines.

Referring to FIG. 4A, one can see that the wine bottle and retention chamber of FIG. 4 is shown. In this case, instead of a battery operated air pump 36a, we have a gas canister 36b. These compressed air gas canisters are generally readily available in the marketplace and are used for life rafts, compressed air guns and the like. It would be desirable if the compressed gas canister 36b was filled with either oxygen or air. This is because as the bubbles are formed, you would get an oxygen exchange with the tannins on both the inside surface of the wine bubble and the outside surfaces of the wine bubble once it is escaped into the air. However, it should be realized that even if the compressed air cylinder 36b was filled with nitrogen, carbon dioxide or the like, the invention would still work albeit at a much slower rate. The reason for this is the inside of the air bubbles would be filled with a relatively inert gas and as they float upward through the liquid wine, little to no oxygen exchange would occur with the tannins and other elements of the wine that promote a better taste. However, once these formed bubbles exit the liquid surface of the wine and enter the expansion chamber 12, they are exposed to surrounding air. These bubbles still have a very large surface area and an oxidation exchange would occur between the exposed environmental air on the outside of the bubbles. Accordingly, this would work, but would not be as effective.

Figure 5:
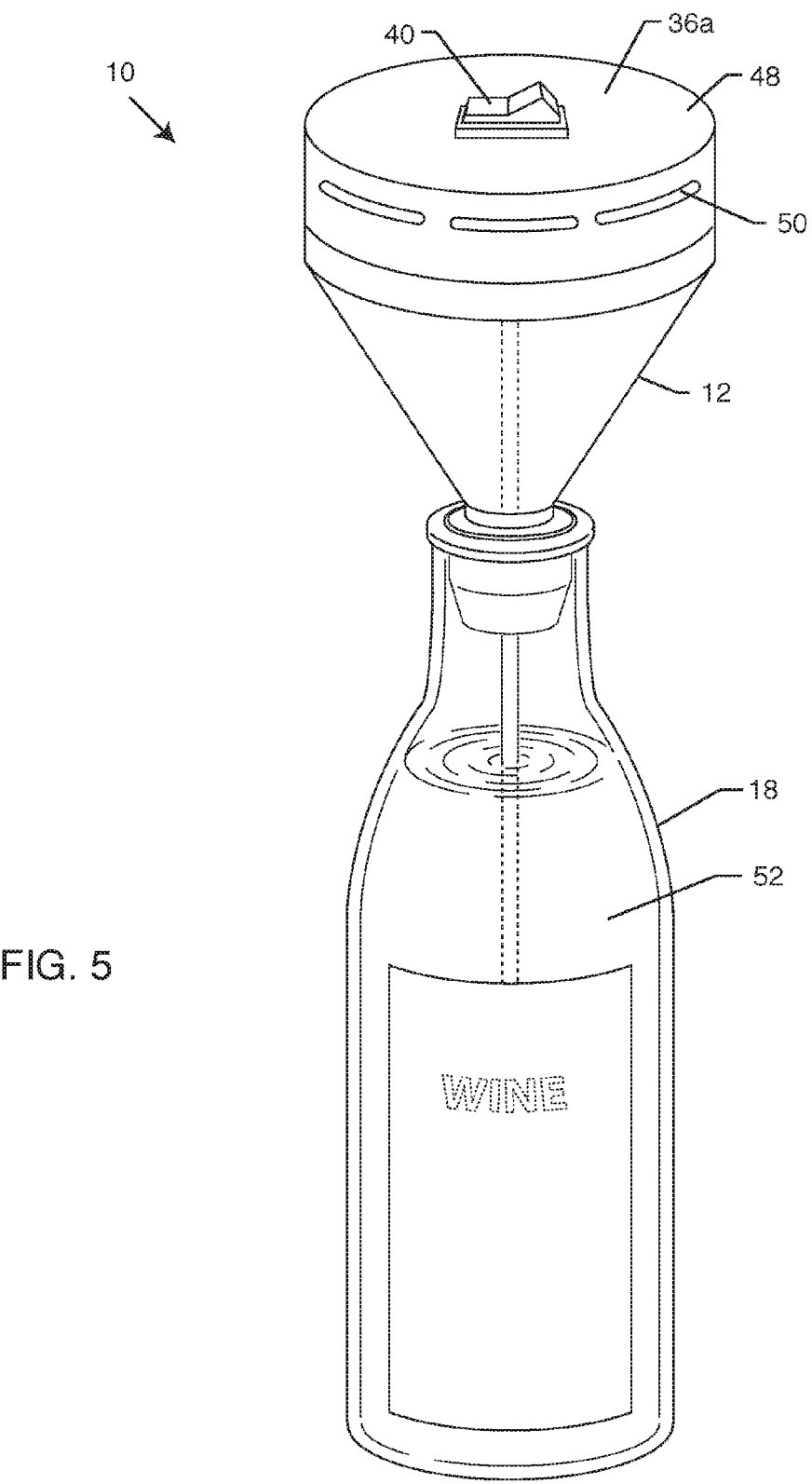
FIG. 5 is a perspective view of another exemplary embodiment of an aerator of the present invention.

FIG. 5 illustrates an alternative embodiment of the present aeration invention 10 showing a wine bottle 18, where the air pump 36a is integral to the expansion chamber 12. As one can see in FIG. 5, there is a switch 40 on the top of the housing 48 and batteries (internal batteries not shown) and an internal air pump with a vent 50 to allow excess gas pressure to escape during the wine bubble 54 (best shown in FIGS. 4 and 4A) formation in expansion chamber 12.

Figure 6:
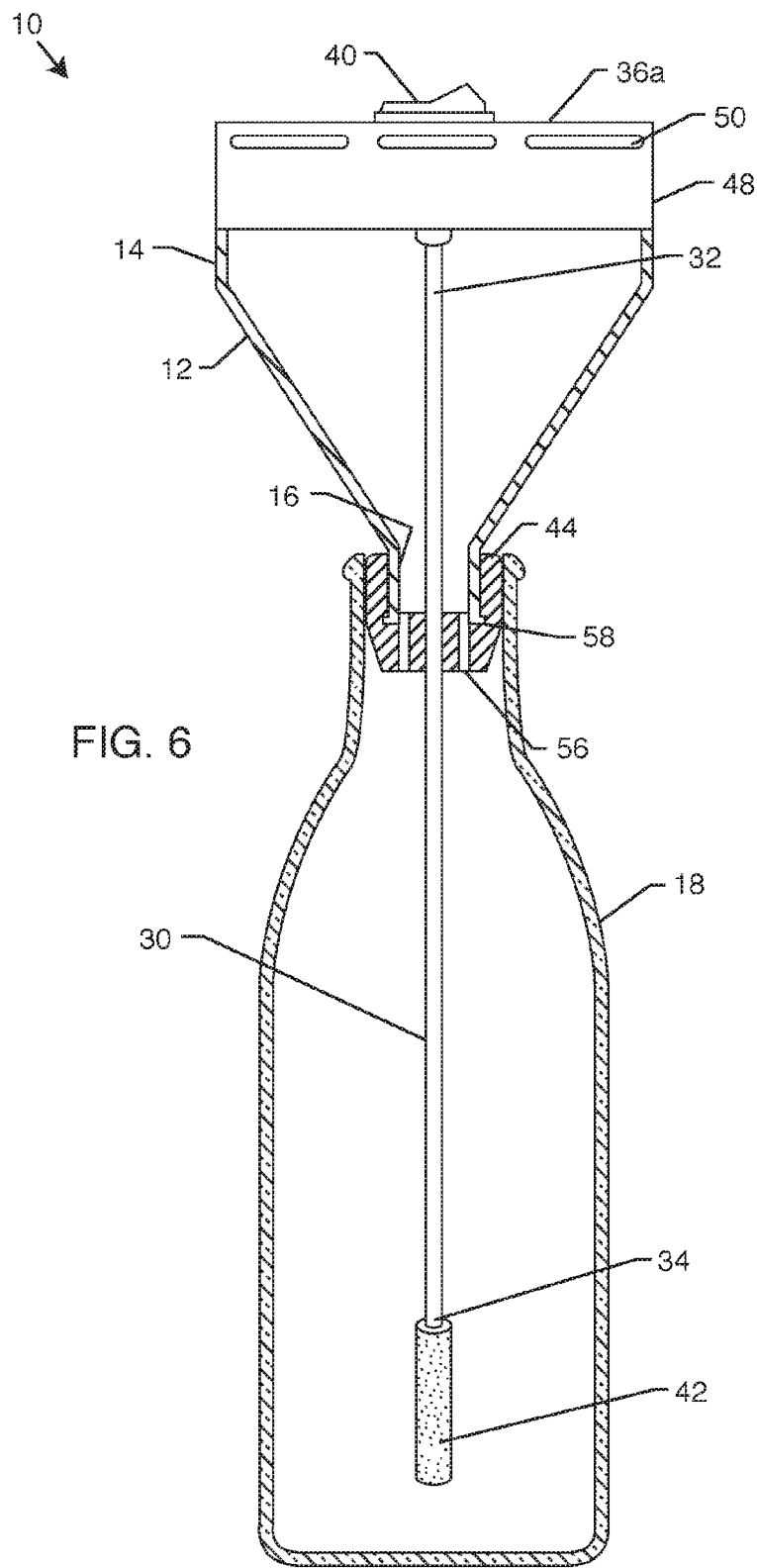
FIG. 6 is a sectional view of the structure of the FIG. 5.

FIG. 6 is a cross-sectional view taken from FIG. 5 showing that the proximal end of the gas conduit 32 is fitted into the end of the removable gas pump housing 48.

Figure 6A:
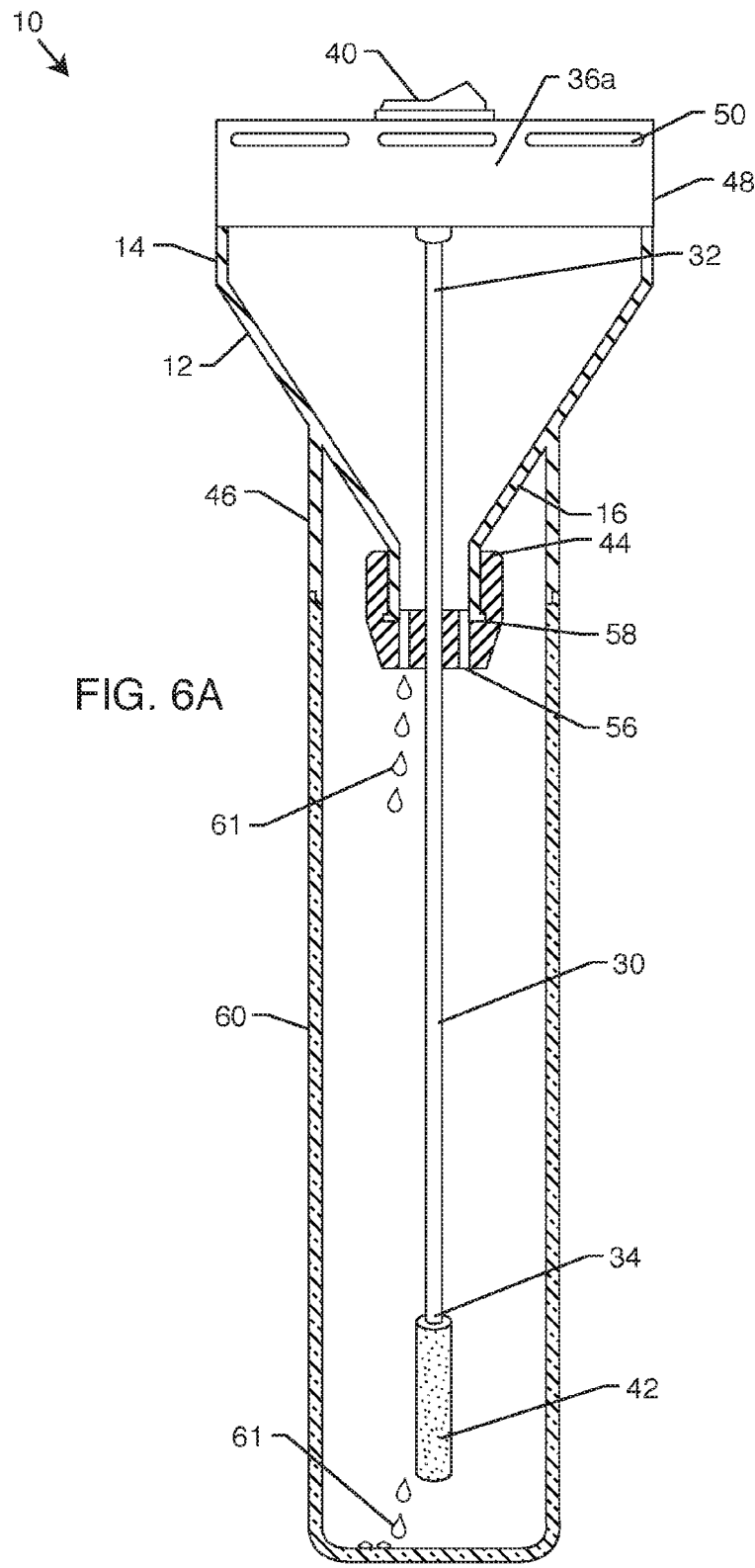
FIG. 6A is a view similar to FIG. 6 now showing an embodiment with a case.

FIG. 6A shows the modification to the expansion chamber 12 including an extension 46 which allows the entire air pump assembly 48 and gas conduit 30 to be inserted into a convenient storage case 60. In a preferred embodiment, the storage case 60 would be of stainless steel or even of clear crystalline glass. The storage case can be adapted to any of the drawings of the present invention and serves several very important functions. First, it provides a convenient way to transport the aerator 10 to a table in a restaurant. Second, after completion of the wine aeration, it provides a convenient place in which to quickly insert the wine aeration assembly 10 and gas conduit 30 such that any drips 61 that would emanate from the distal end 34 of aeration element 42 to then collect in the bottom of the case 60 where it could be easily wiped out. Drips 61 could also come from the passageways 56, as shown. Again, the case 60 could be made of any material, including plastics and the like.

Figure 7:
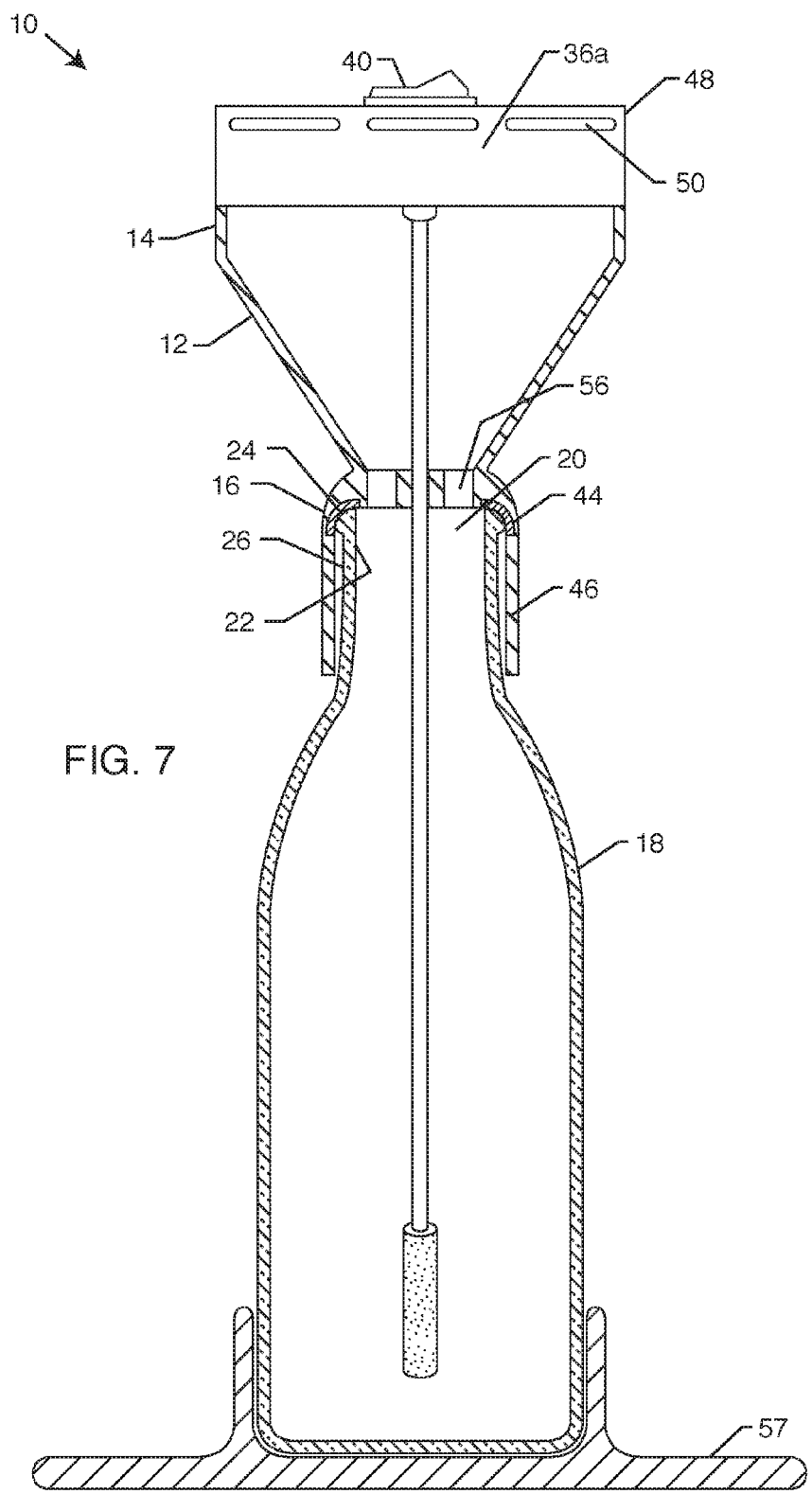
FIG. 7 is a sectional view of another exemplary embodiment with a different sealing element and a base.

FIG. 7 is very similar to the apparatus previously described in FIG. 6, except that in this case, there is an extension 46 that extends over the neck of the wine bottle 18. This provides some structural stability to avoid tipping of the aeration assembly 10 when in use. In this case, the sealing element 44 abuts to the outside surface 26 of the wine bottle opening 20, which fits tightly in place so that the froth and bubble formation 54 from FIGS. 4 and 4A will not leak down the outside of the wine bottle 18. Also shown is an optional base 57 into which the wine bottle can be inserted to further prevent tipping. This base piece 57 could be of glass, stainless steel, a plastic ring or the like.

Figure 7A:
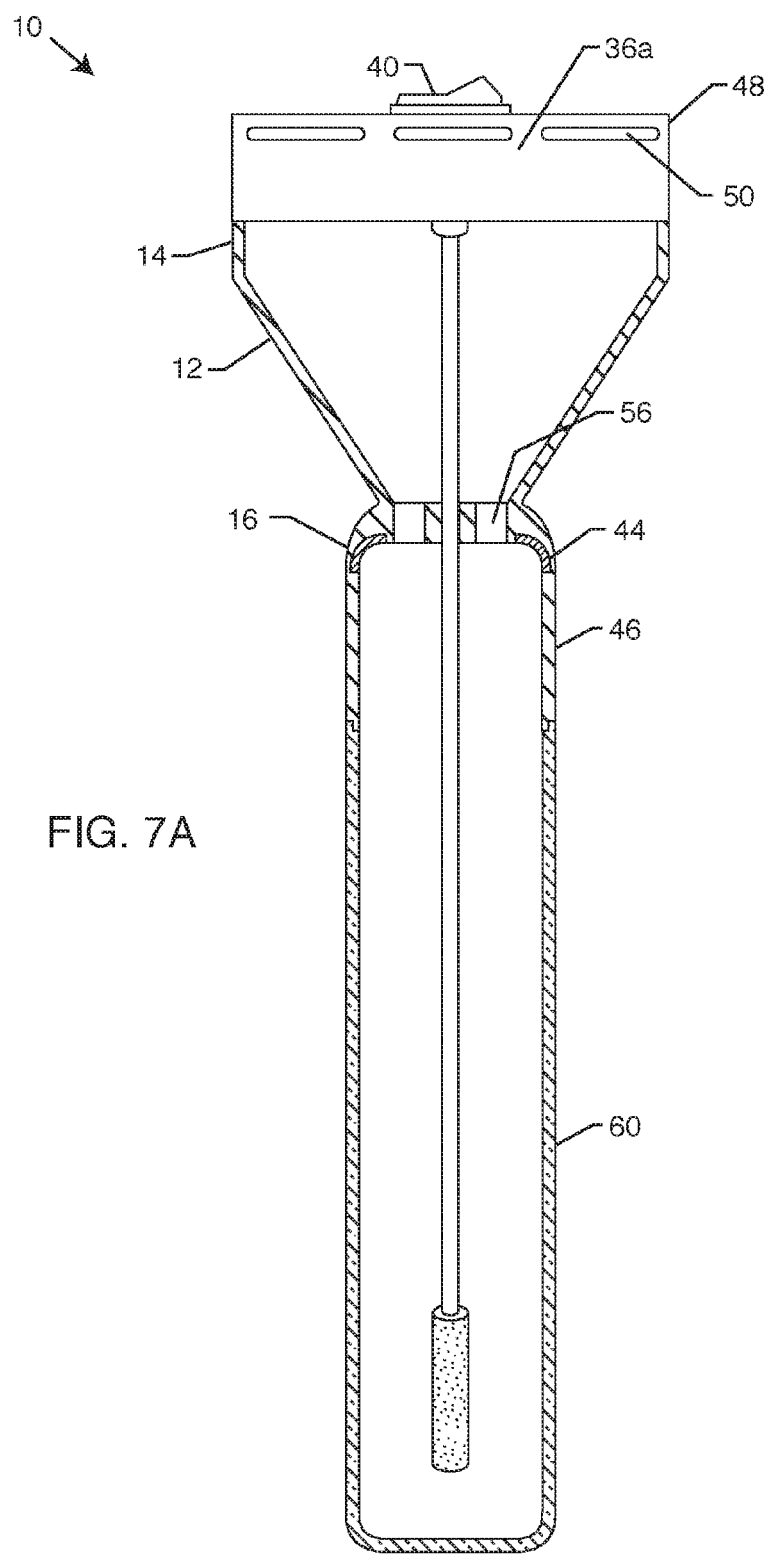
FIG. 7A is a view similar to FIG. 7 now showing the aerator with a case.

FIG. 7A is very similar to FIG. 7, except that it is shown mated with a case 60 as previously described in FIG. 6A.

FIG. 8 is very similar to FIG. 7, except that the electrically operated pump structure 36a (previously shown in FIG. 4) has been replaced by a manual squeeze ball pump 36c. When a user squeezes the ball pump 36c, air is forced through the gas conduit 30 from the proximal end 32 to the distal end 34 and out through the aeration element 42. In this case, the expansion chamber 12 is shown below the squeeze ball 36c. The expansion chamber 12 is cylindrical in shape as compared to the previous cone shapes. It is understood that the expansion chamber 12 may take a variety of shapes and configurations and this disclosure is not limited to the precise forms described herein.

FIGS. 9A and 9B illustrate that the squeeze ball 36c of FIG. 8 could be replaced by a manual piston-type air pump 36d, as illustrated. The piston-type pump 36d may provide pressure and gas through the gas conduit 30 on either one motion of direction (typically going downward) or even both directions of motion through the use of various one-way valves.

Figure 10:
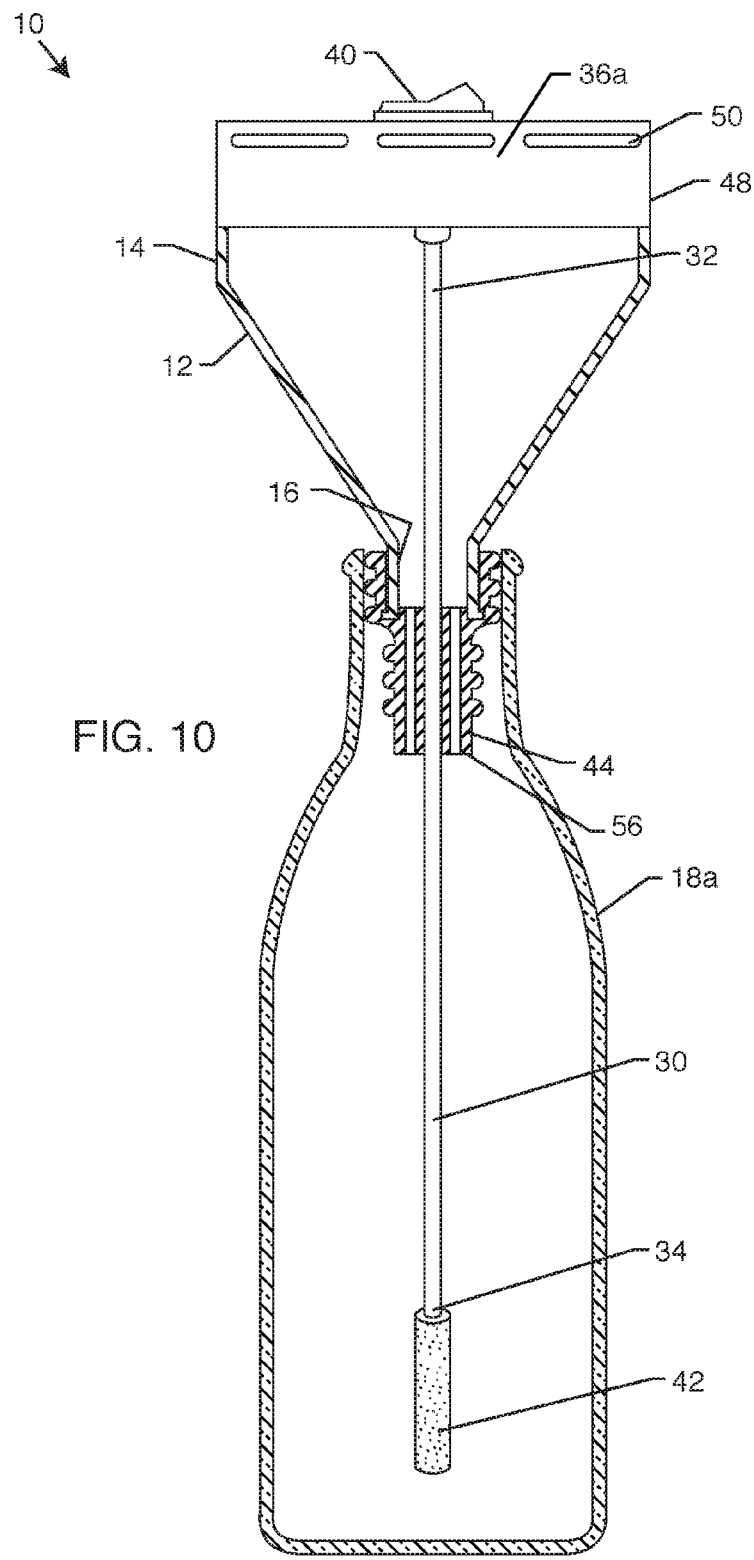
FIG. 10 is a sectional view of another exemplary embodiment of an aerator now with a sealing element configured to seal into different sized wine bottles.

FIG. 10 shows that the sealing element 44 can comprise a variety of shapes such that it is insertable and sealable into both the standard 750 mL wine bottles 18 and even larger wine bottles 18a as shown herein. The sealing element 44 has at least two sizes of seals that are configured to engage into the at least two sizes of wine bottles 18 and 18a.

The use of fluid communication as used herein describes the ability to transport gases, air and/or liquids and is not limited to the transportation of just liquids.

Figure 11:
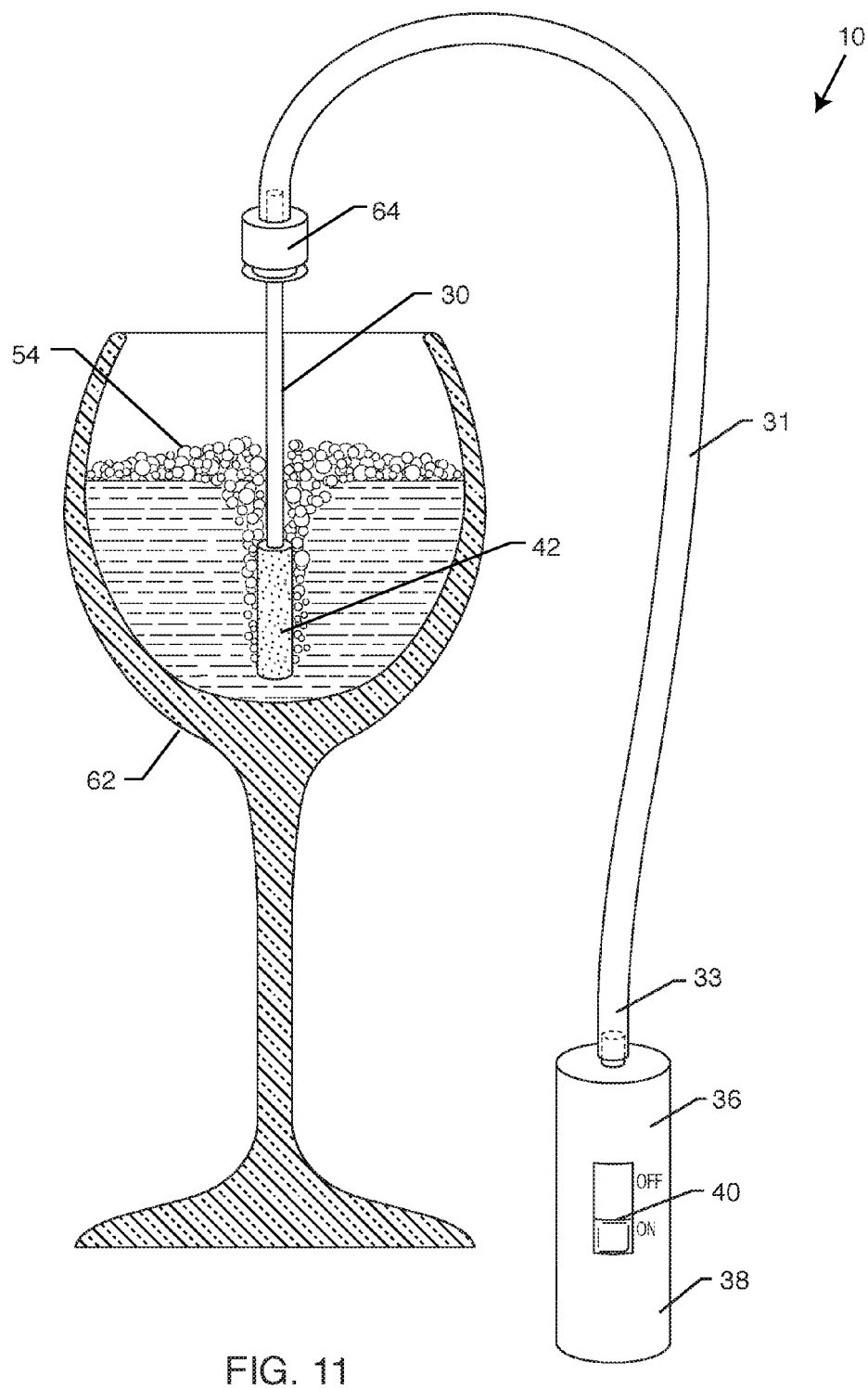
FIG. 11 is a sectional view of another exemplary embodiment of an aerator now with a quick-disconnect feature.

FIG. 11 illustrates a wine glass 62. In general, connoisseurs of red wine prefer relatively large wine glasses, such as the Libbey 8414 Citation 12 ounce glass. The reason that red wine glasses have evolved to have very large surface area has to do with improving the taste of the wine by swirling it or letting it sit for extremely long periods of time, thereby facilitating oxygen exchange. In the present invention, the wine glass 62 can be of any shape or dimension, even one small in diameter and/or like a tall champagne flute. This is because the present invention can provide aeration to the wine in any shape of wine glass.

Aeration element 42 has been previously described and can have various densities providing varying diameters and velocities of the air bubble 54. Element 64 is a quick disconnect allowing one to disconnect the gas conduit 30 from the gas conduit extension 31. Having this quick disconnect facilitates a number of things. For example, by disconnecting the gas conduit 30 from the gas conduit extension, one can then place the subassembly of the gas conduit 30 with aeration element 42 into a dishwasher for cleaning. This also facilitates changing out various aeration elements for different types of wine. For example, having a more aggressive aeration for a heavy body wine like Burgundy would be in marked contrast to a lesser body wine like a Zinfandel, where finer bubbles may be optimal.

Figure 12:
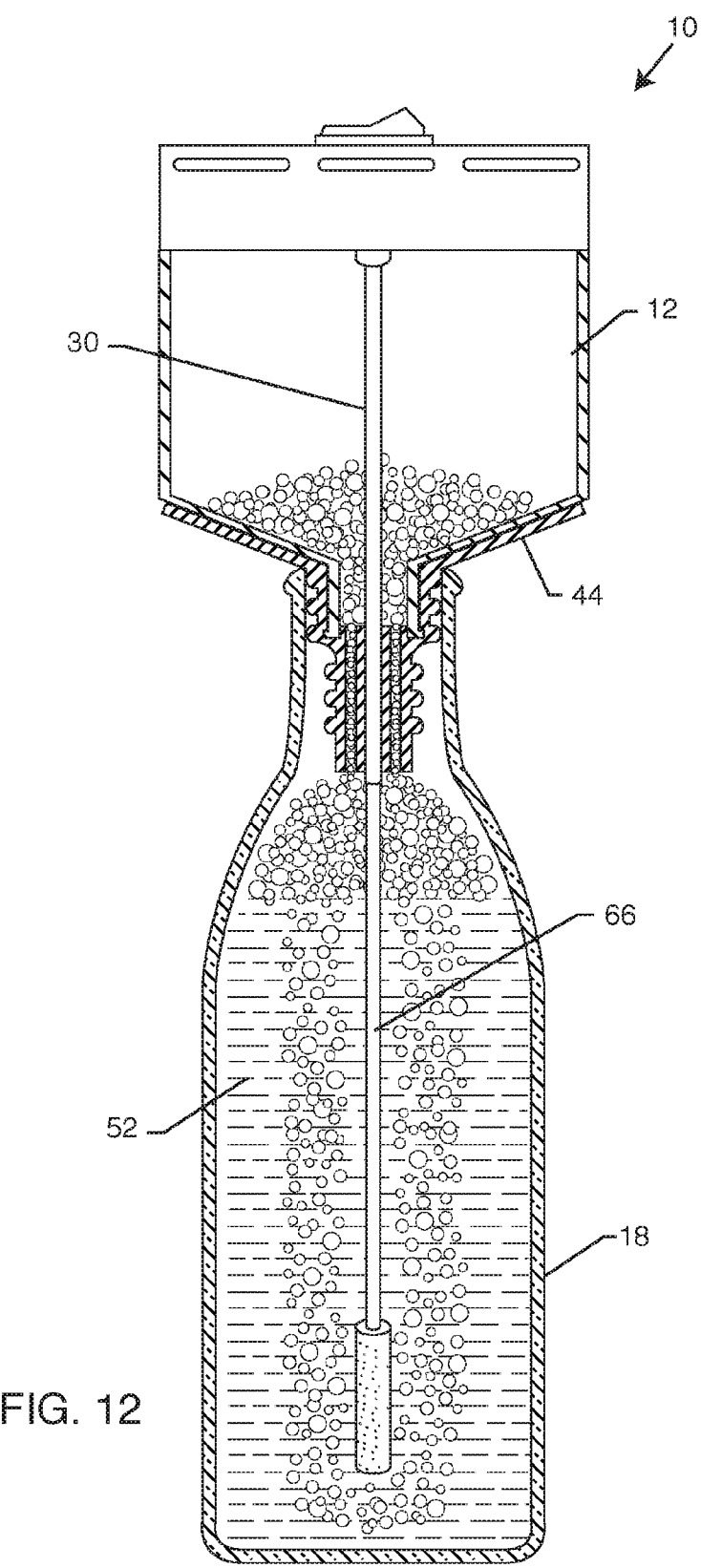
FIG. 12 is a sectional view of another exemplary embodiment of an aerator now with a telescoping gas conduit inside of a wine bottle.

FIG. 12 illustrates that the previous gas conduit 30 can be made into a telescoping gas conduit 66 (30). This is useful, for example, a shorter bottle of wine (also called a split) and a taller or regular bottle of wine or even a magnum bottle of wine, which is much taller. Referring once again to FIG. 12, one can see that the expansion chamber 12 has an integral rubber seal 44. By its own weight, this causes a seal between the top lip of the wine bottle and the chamber 12. This is important so that the wine bottles do not leak out and overflow down the sides of the wine bottle. Instead, this way the bubbles form inside the wine bottle and then are transferred into the expansion chamber 12 without leakage.

Figure 13:
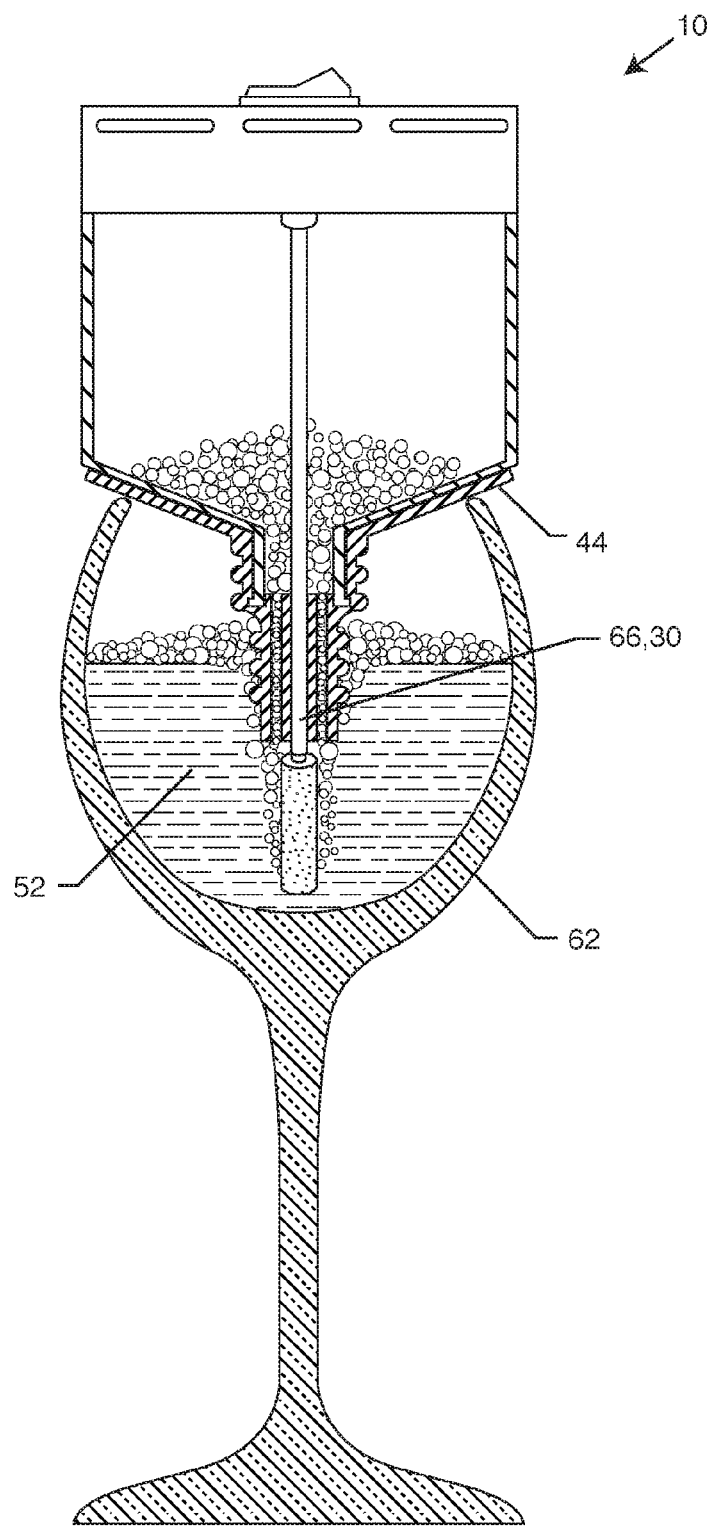
FIG. 13 is a view similar to FIG. 12, now showing the telescoping gas conduit retracted to fit a wine glass.

FIG. 13, in some ways, is very similar to FIG. 12, in that, the gas conduit 66 (30) is telescoped such that the entire apparatus will fit a wine glass 62. Again, there is a rubber, foam or seal 44 that prevents wine bubbles from overflowing the wine glass. The design of the seal 44, which is matched to the diameter of aerator assembly 10 allows a seal to be made with various diameter and sizes of wine glasses.

Figure 14:
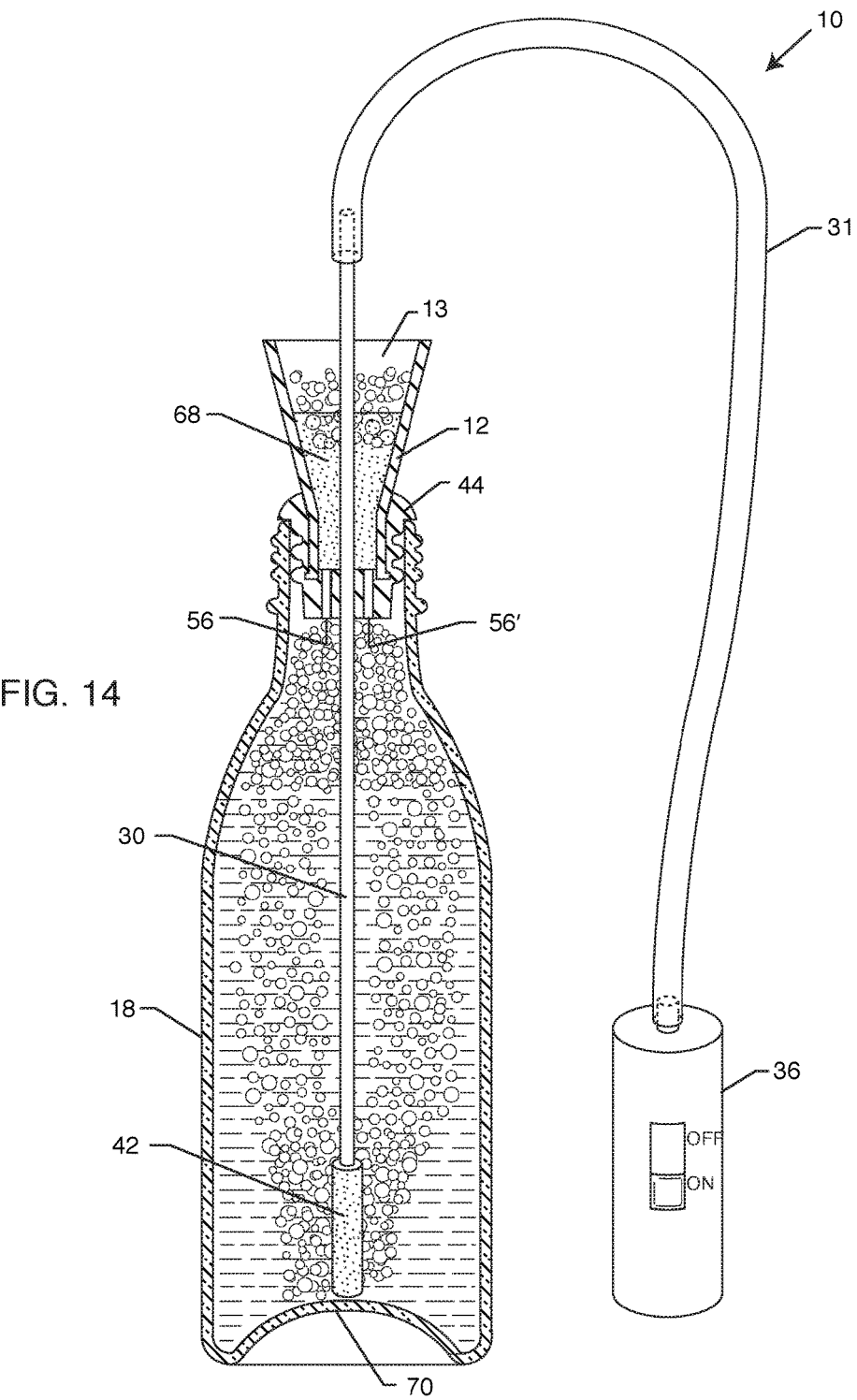
FIG. 14 is a sectional view of another exemplary embodiment of an aerator now with an additional bubble-reducing, aeration element.

The wine aerator apparatus 10 illustrated in FIG. 14 embodies dramatic improvements over all the previous embodiments previously described. Aerator system 10 of FIG. 14 eliminates the need for an open and large expansion chamber 12 sitting on top of the wine bottle whereas a smaller expansion chamber 13 may be utilized. First of all, the wine bottle 18 is more accurately drawn, in that, it includes a punt 70. Almost all wine bottles have a punt 70. This not only increases the strength of the wine bottle, but also leaves an area on either side of the punt (think of this as a diameter) where sediments may collect. In general, the aeration element may ideally be spaced at or slightly above the punt so it will not stir up the sediments.

Air bubbles flow out of the aeration element 42 and foam up on the top surface of the liquid inside of the wine bottle. These air bubbles, which are now under some pressure, go through the sealing area opening holes 56, 56', 56n (in other words, any number of air passage holes may be provided). The air bubbles would flow right out of the much smaller volume expansion chamber 13, except in this case, a novel secondary filtering element 68 is included. This element 68 is a bubble-reducing or bubble breaking filter element. This causes the bubbles to break up and turn back to a liquid whereby gravitational action will return the liquid back to the inside of the wine bottle.

It is desirable (but not necessarily required) that there be a space 13 above the bubble-reducing, filter element 68 so that one can readily observe whether the bubbles are exceeding the capacity of the remaining expansion chamber to hold them from overflowing. Also, the bubble-reducing filter element 68 may have a range of heights, diameters and porosities. For example, the bubble-reducing filter element 68 may be from 0.01 to 2 inches in height, but also may be above 2 inches in height. As can be understood by those skilled in the art, the height and size of the bubble-reducing filter element 68 will be dependent upon its ability and efficiency in reducing bubbles.

Referring back to the bubble-reducing, filter element 68, this can be a stainless steel mesh, it can be a stone, it can be plastic fibers, a plastic mesh, a filtering element (replaceable), paper elements or the like. The bubble-reducing, aeration element 68 may include fine mesh stainless steels, such as SS304 grade woven wire mesh. One example is from the Mesh Company, wherein multiple layers of woven wire mesh varying in sizes from Number 40 mesh all the way to Number 55 mesh could be used. Meshes of stainless steel grade 430 are also applicable. Much finer meshes that would allow air to pass, which would break up bubbles, include Number 60 mesh through Number 500 mesh. In general, one can use mesh size or pour size of microns. Through experimentation, the inventors have found that a pour size of microns would vary anywhere from 1-500 microns. In another embodiment, the pour size would be 0.1-200 microns. Any food grade material that would be stable in the presence of wine (in particular, alcohol) and cleanable can be used, such as Porex. The critical point is that the bubble-reducing, filter element 68 readily pass air, but break up wine bubbles. The gas source 36, which in most embodiments is a battery operated air pump, can be designed to provide various air flow rates. It is a careful design balance between the flow rate of the air pump 36 and the pore or mesh size of the bubble-reducing, filter element 68.

Referring once again to the construction of the bubble reducing filter element 68, one could also use polyester filtration fabric, such as the manufactured by a company called SAATIFIL™. SAATIFIL™ makes polyester fabrics in a variety of pore sizes and mesh counts. In addition, they make folded structures, which can be individually folded fabric or higher porosity sheets of fabric that bind a much more dense sheet of fabric in between, again folded up in accordion style. Accordion-style structure could be advantageous for bubble breaking filter element 68 in that, the bubbles would transition through a filtration breaking zone and then into air thereby allowing the bubbles to return to a liquid and then through the next bowl and the like. The SAATIFIL™ specification sheet indicates that mesh openings are available from 7 to 1950 micrometers with varying mesh counts. In this case, the materials can be polyamide or polyimide (PA) or polyester (PEF or PET). All of these materials are biocompatible. Samples of these materials were obtained by the inventors from the Medical Device and Manufacturing show in Anaheim, in February 2016 and evaluated. Any other biocompatible or food grade plastics could, of course, be used in place of these materials.

Referring now to aeration element 42, it is necessary that aeration element 42 be food grade or FDA compatible and also highly resistant to solvents. By highly resistant to solvents, we in particular mean the alcohol contained in wine. The inventors first experienced with the stones made for aquarium pumps that they rapidly deteriorated as they were made of plastic composites and sand or stone containing a binder material. First of all, these materials are not food grade and second, they were not chemically resistant and rapidly degraded and wore away during long term experience aerating wine. So it became a necessity for the inventors to locate a suitable aeration element material 42 that would be long term biocompatible, biostable, non-toxic and resistant to chemicals. After studying this situation, the following list of materials prove to be ideal for the application:
1) high purity porous ceramics, such as porous alumina ceramic. These are general manufactured by mixing the ceramic paste with a solvent and a binder, which both completely burn out during sintering, thereby leaving behind a porous ceramic structure.
2) high density polyethylene is another ideal material (HPPE or HDPE);
3) a close cousin is ultra-high molecular weight polyethylene (UHMWPE);
4) polyvinylidene fluoride (PVDF);
5) and polytetrafluoroethylene (PTFE). This material also goes by brand names of Gore Tex, Teflon and the like.

A major advantage of these materials is that companies, such as Porex Technologies Corporation located in Georgia, can formulate EPHDPE, UHMWPE, PVDF and PTFE into solid, but porous shapes. These materials are ideal to form the shape of the novel aeration element 42 of the present invention. Through experimentation, we have found that ideal pore sizes vary from 0.1 to 100 microns. Two particular aerators 42 that we have extensively tested, have a mean pore size of 45 to 75 microns and a second one had a mean pore size of 20 to 30 microns. Both of these formed a high density of small to medium to large bubbles and provided ideal long aeration. It will be understood that one can use pore sizes of less than 100 microns or less than 200 microns or even less than 500 microns depending upon the corresponding pump flow rate to achieve the desired goals. The desired goals being the proper aeration and taste improvement of wine within a reasonable time period. In other words, in the present invention, one is trying to achieve proper aeration of wine and taste control within seconds, or at most minutes, as opposed to typical decanting methods which can embody as much as several hours. The inventors experimented with distal aeration elements 42 obtained from Porex Technologies. We evaluated three different porosities. The first porosity was 20 to 30 microns. The second porosity was approximately 25 to 35 microns. The third porosity was between 45 to 75 microns. It was found that all three of these micron ranges work well as long as one varies the flow rate of the pump 36 accordingly. We used the maximum flow rate on this experiment of 4 liters per minute and a minimum flow rate of 0.5 liters per minute and we found that we could get each one of the stones to adequately aerate the wine in a reasonable amount of time. Through these experiments, we think an upper flow rate on the order of 10 liters per minute we think a lower pump flow rate would be on the order of 0.1 liters per minute. It also became apparent that the ability to adjust the flow rate while visualizing the wine, the bubbles and the height of the bubbles becomes a critical factor. Accordingly, there is a need for an adjustable flow rate embodiment of the present invention. Reasons for the needed variable flow rate adjustability include the vast differences and viscosities of the types of wine (red wines in particular) and also the fact that the flow rate that generate bubbles will vary with altitude (height above sea level). Because of people's enjoyment of wine in ski chalets and perhaps even in an underwater diving habitat, the patent will cover flow rates from 0.1 to 20 liters per minutes, realizing the "sweet spot" is between 1 and 10 liters per minute.

A complicating factor is that not all red wines have the same viscosity. For example, there are some relatively light bodied red wines, such as the Zinfandels and Pinots, which are in contrast to heavier bodied red wines, such as Cabernet Sauvignons and Bordeauxs. Through actual experimentation with steel wools and meshes, the inventors have discovered that, in general, the air flow rates of the air pump 36 will vary from 0.10 to 20 liters per minute (or 1 to 10 liters per minute). The inventors have found that approximately 0.5 to 3.0 liters per minute may be ideal for the aerator apparatus 10, as illustrated in FIG. 14, which embodies both an aeration element 42 and a bubble-reducing, filter element 68. By experimenting with various sizes of steel wool mesh, the inventors have also been able to determine that it may be desirable to have a pump 36 that has adjustable or variable flow rates. The reason for this is because of the varying viscosities depending on the type of grape and the type of wine or blend. Referring once again to FIG. 14, one can see that there is a rubber or equivalent sealing element 44, which is press-fitted into the inside diameter of the neck of wine bottle thereby preventing wine bubbles from escaping and creating a mess.

Figure 14A:
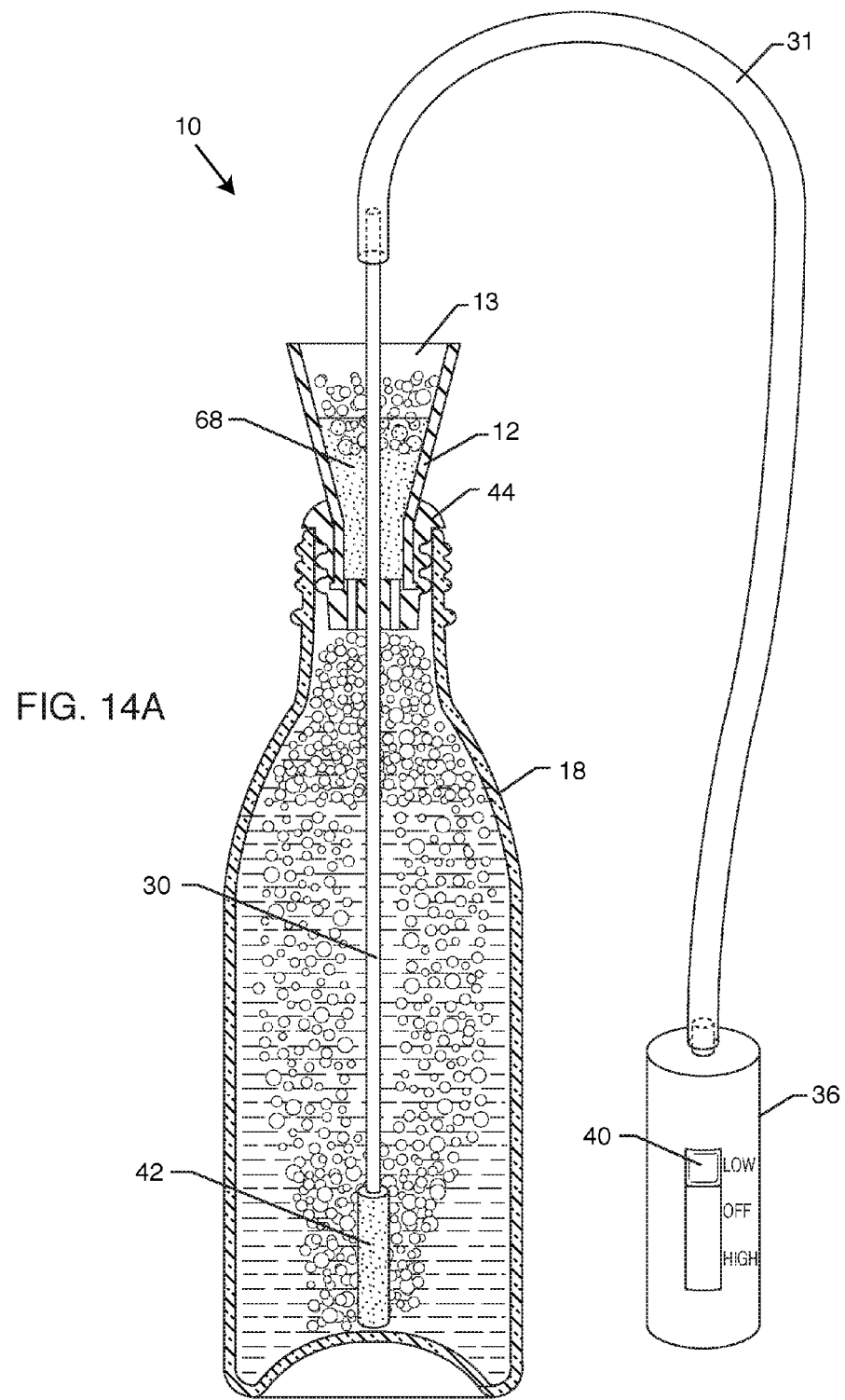
FIG. 14A is a view similar to FIG. 14, now showing an air pump with a high and low setting.

FIG. 14A illustrates that the air pump 36 has a switch 40 with an off position and a low and a high flow rate. For example, the low flow rate may be 0.5 liters per minute and the high flow rate may be 3 liters per minute. As previously described, the low flow rate may go as low as 0.01 liters per minute and the high flow rate may go as high as 10 liters per minute.

Figure 14B:
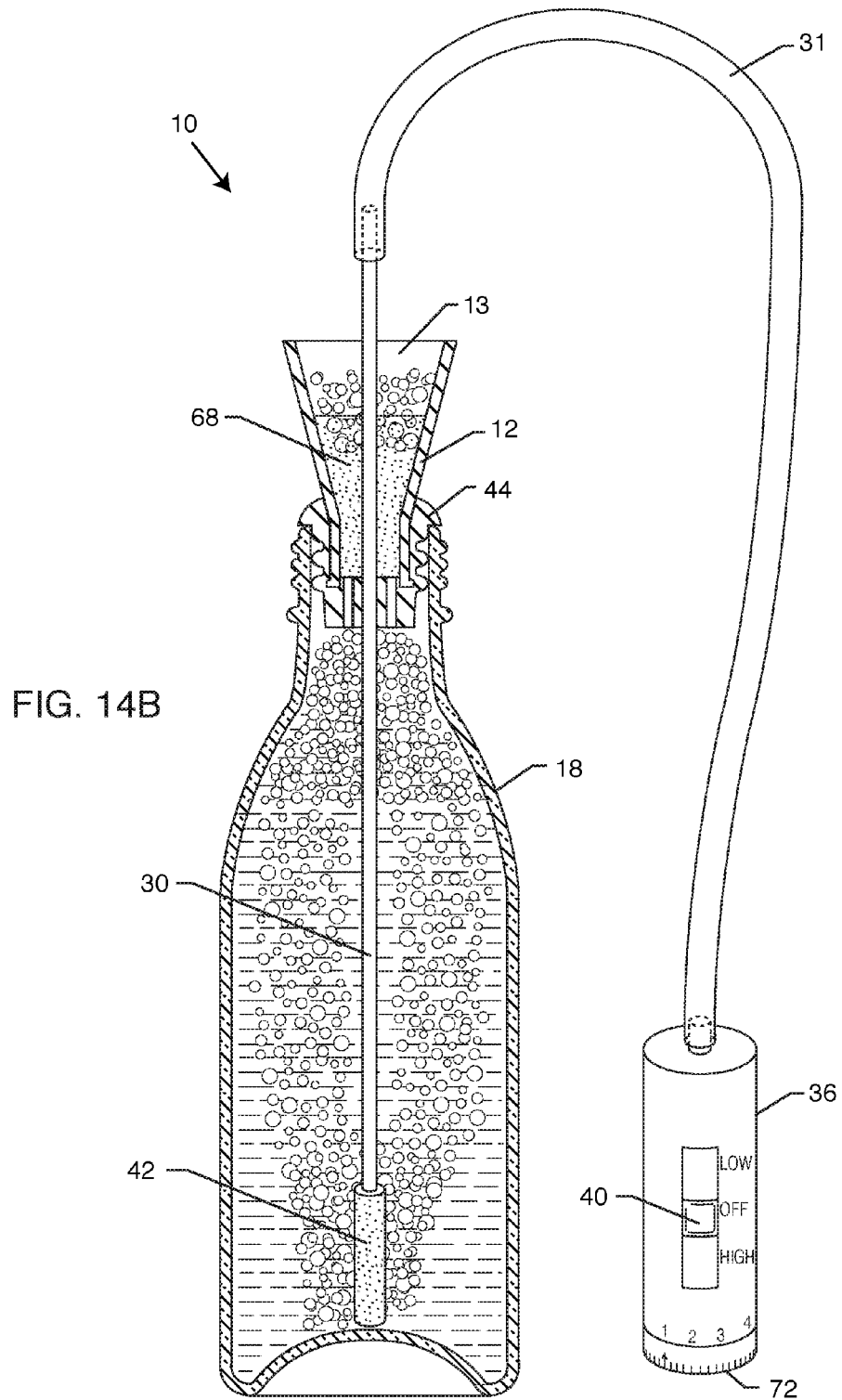
FIG. 14B is a view similar to FIG. 14A, now showing the air pump with a timer.

FIG. 14B illustrates a timer 72. This is a twist knob (but could take any shape), wherein the operator can adjust the air pump 36 to automatically shut off after a preset time has elapsed. For example, if one was using a very slow flow rate, such as 0.01 liters per minute, it may take 5 to 10 minutes to properly aerate the wine and have it ready for consumption. One could then adjust the timer knob 72 to the desired time setting. Obviously, this may take some experimentation on the part of the consumer. This would allow the consumer or restaurant server to start up the air pump 36 and then walk away, as it will automatically shut off. Excess aeration can damage certain delicate wines, such as Merlots. For example, one would not want to aerate the wine for half an hour. Accordingly, the adjustable timer 72 is very important so that one does not damage a delicate wine.

Figure 14C:
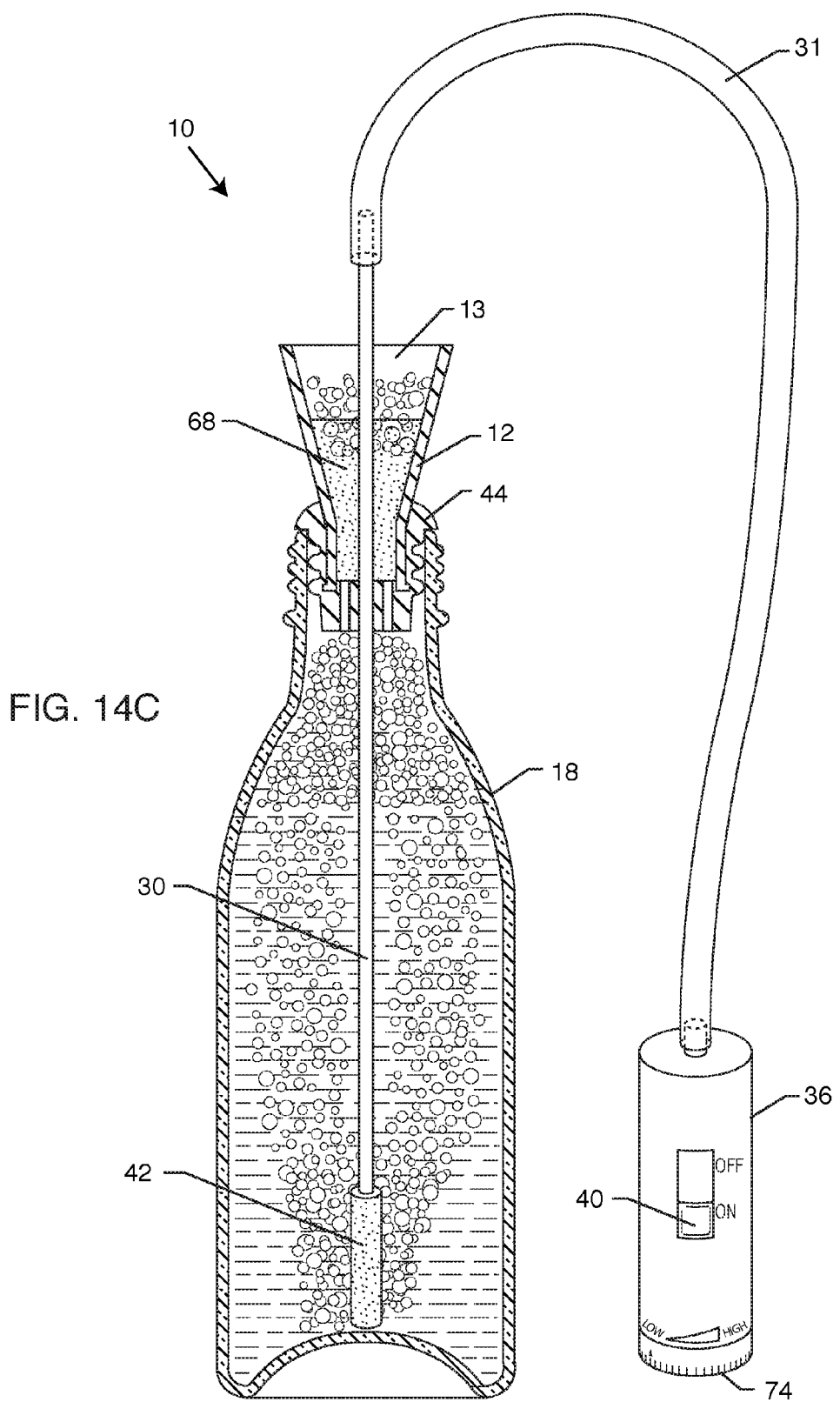
FIG. 14C is a view similar to FIG. 14, now showing a variable flow rate air pump.

FIG. 14C illustrates an air pump 36 with a simple on/off switch 40. In this case, there is a flow rate adjustment knob 74 located at the bottom of the assembly. This is in the same position as in the previously described timer 72 of FIG. 14B. In this case, the consumer may adjust the flow rate from a very low setting (as low as 0.1 liters per minute) to a very high setting (such as 20 liters per minute). In this way, one can experiment with the viscosity of the wine and make sure that it is being bubbled, but that the bubbles are not overflowing the bubble-reducing filter element 68 and expansion chamber 12 and 13. As is understood by those skilled in the art, any of the embodiments shown in one figure can be applied to another embodiment shown in a different figure, as these examples are not intended to be mutually exclusive.

In general, the pumps of the present invention are powered by DC Motors. One of the important features of a DC Motor is that its speed can be controlled with relative ease. There are generally three basic types of DC Motors: Series, Shunt and Compound. In general, speed can be controlled by the terminal voltage of the armature, the external resistance and the armature circuit and the flux per pole. Speed control of a DC Series Motor can be done either by armature control or by field control.

A brushless DC Motor is controlled by an electronic circuit. Fortunately, these can now be bought at very low cost as chips. For example, see Motor Driver Part No. DRV8301 built by Texas Instruments. The brushless DC Motor (BLDC) has become very popular in many applications. An advantage of the BLDC Motor is it can be made much smaller and lighter than a brush-type motor with the same power output. This makes it ideal for the present invention. In addition, there are no brushes to wear and no metal particles to worry about getting into wine. BLDC Motors also lend themselves to either resistive or digital speed controls.

Figure 14D:
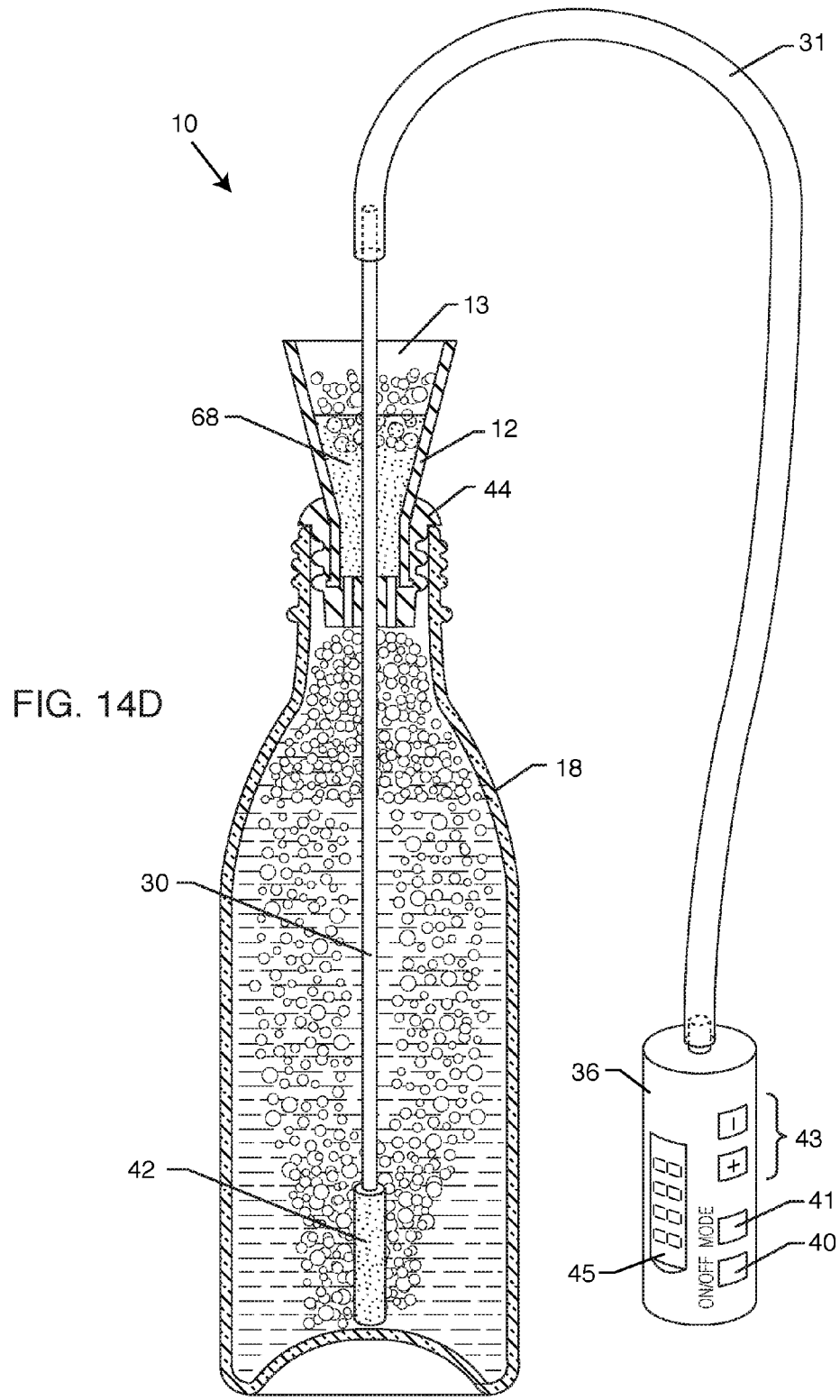
FIG. 14D is a view similar to FIG. 14, now showing a digital display integrated into the air pump.

FIG. 14D illustrates another embodiment where the pump body 36 has a push button mode switch 41, an on/off switch 40 and then +/− switches 43. It also has a digital display 45. In one embodiment, this would be a 4-segment display 45. By pushing the mode switch, one can cycle through what the display is showing digitally. For example, one push of the mode switch 41 would display flow rate and then one could use the + and − buttons 43 to raise or lower the flow rate across a range. By pushing the mode switch 41 again, after having already selected a flow rate, one then goes to a timer mode. Again, by pressing the + and − buttons 43, one can increase the amount of time or decrease the amount of time. For example, it has been previously stated that an ideal flow rate for many wines is about 2.8 liters per minute. So when one pushes the mode button once and it goes to flow rate, it could default to 3 liters per minute. Then one could use the + and − buttons to lower it or raise it. Using a proper motor controller chip, this would be almost infinitely variable up and down from very slow to very fast. The same could be done when you press the mode switch a second time when it goes to the time display. The default time, for example, might be 20 seconds and one could lower that down to just a few seconds or to as much as several minutes.

Figure 14E:
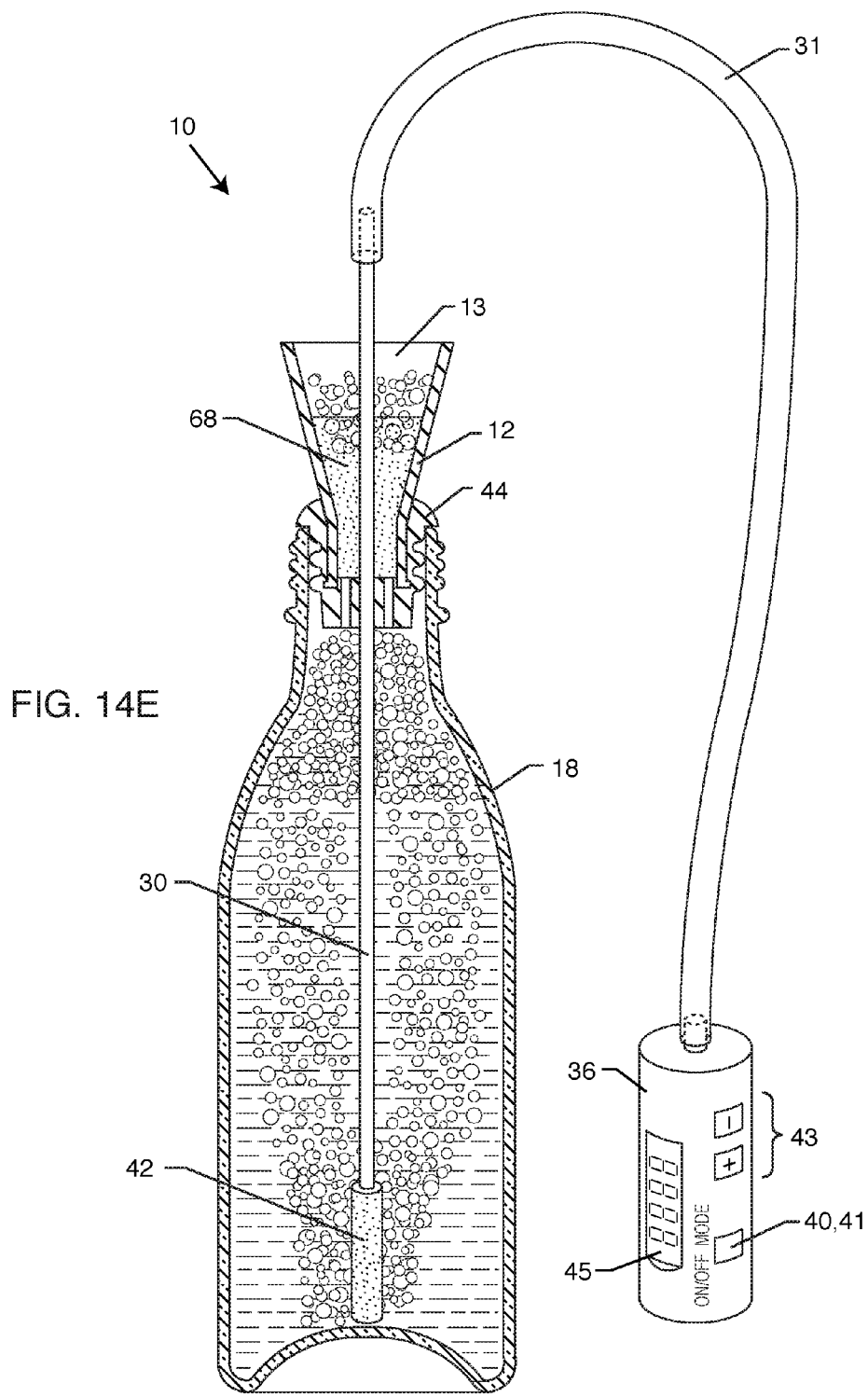
FIG. 14E is a view similar to FIG. 14D, now showing a simplified button layout with the digital display integrated into the air pump.

FIG. 14E is another embodiment where the separate off/on push button could be eliminated and everything could be done off of one switch 40, 41 which is both the on/off switch and the mode switch. In other words, with one push of the switch 40, 41 the digital display would display ON and then a second push of the switch 40, 41 would display FLOW RATE and then a third push of the switch 40, 41 would display TIME. Pushing a fourth time would then display OFF. Speed control can also be achieved through resistive voltage dividers whereby, multiple position switches that are switching in various values of resistors then control the voltage and the armature circuit. This was previously described in FIG. 14-14A of the slide switch. One could also use a variable resistor configured as a potentiometer.

FIG. 14F illustrates yet another embodiment where there is an on/off switch 40, but now there is a separate timer switch 72 and a separate flow rate switch 49. Now the timer and flow rate can easily be selected and changed. For instance, one could combine the teachings of FIG. 14C and FIG. 14D. To do this, one would remove the on/off switch 40 from FIG. 14C and replace it with the digital display 45 and the on/off switch 40 and the mode switch 41 from FIG. 14D. However, referring back to FIG. 14C, one would keep the rheostatically controlled flow rate switch 74. In the inventors' experience, when one is observing bubble flow, one has to very quickly make both coarse and fine flow rate adjustments in order to hold the bubbles at an equilibrium height. A rotary style pump flow controller is best for this purpose, This would take the form of a rheostat or potentiometer with a knob 74, as illustrated in FIG. 14C.

Figure 14G:
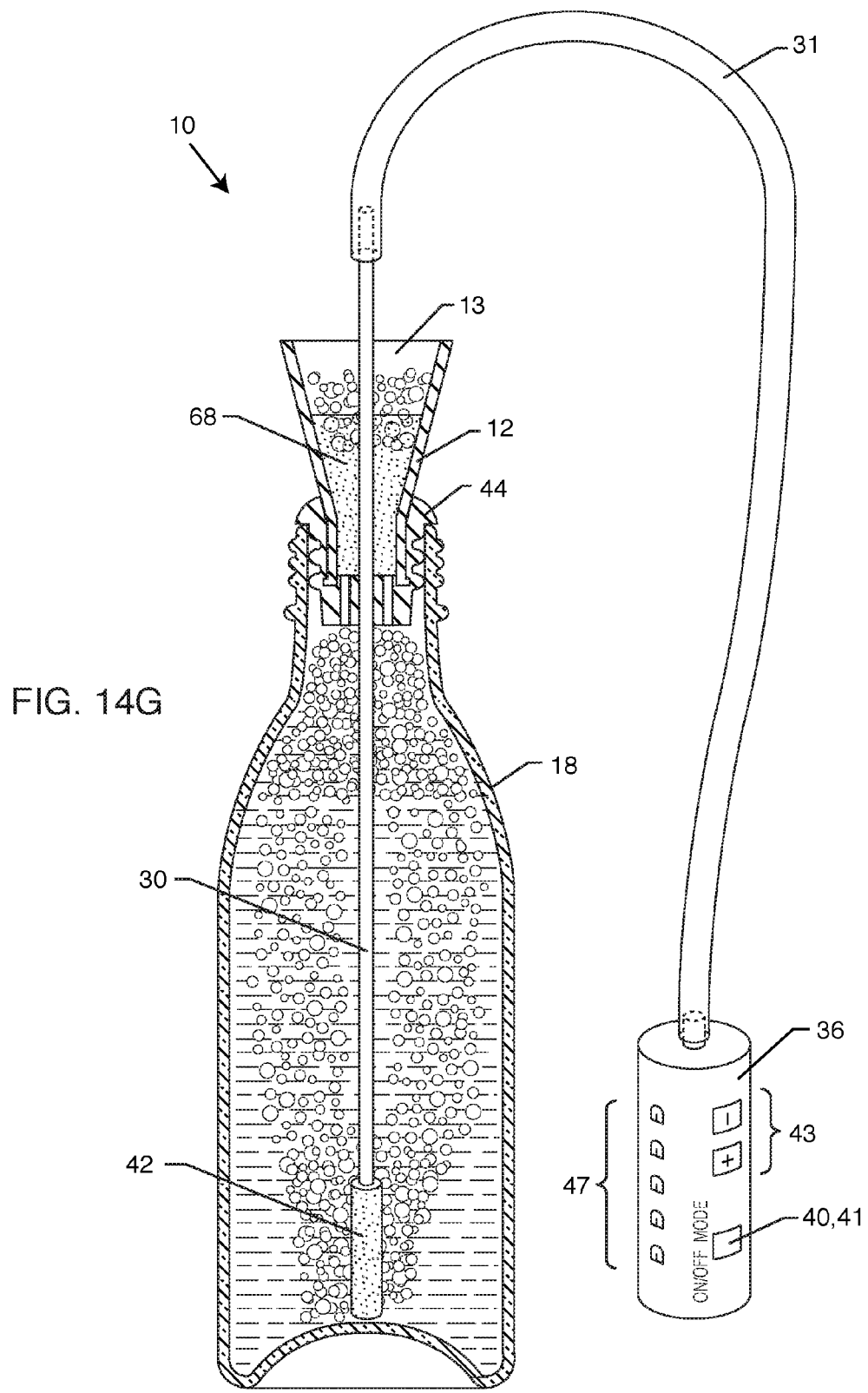
FIG. 14G is a view similar to FIG. 14, now showing an air pump with LEDs for displaying information.

Another type of digital control indicator is illustrated in FIG. 14G. In this case, there are a number of LED lights 47. This replaces the digital display 45 in the previously described controller. A low flow rate setting would be when one LED light was on and when all the LED lights came on, it would be the highest flow rate. When one pressed the mode switch again, one would go to the time function and a short period of time would be one LED light and a longer period of time would be when all the lights are lit. As can be understand by those skilled in the art when reviewing FIGS. 14-14F, any of the structures and teachings taught herein can be cross applied to any of the embodiments disclosed throughout this specification.

Figure 15A:
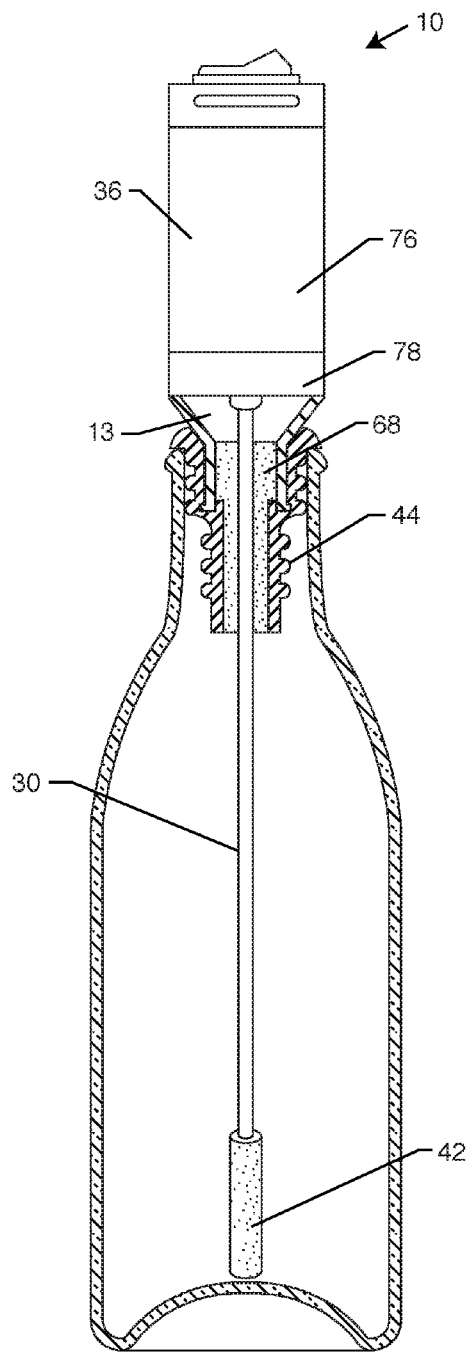
FIG. 15A is a sectional view of another exemplary embodiment of an aerator now integrated as a single assembly.
Figure 15B:
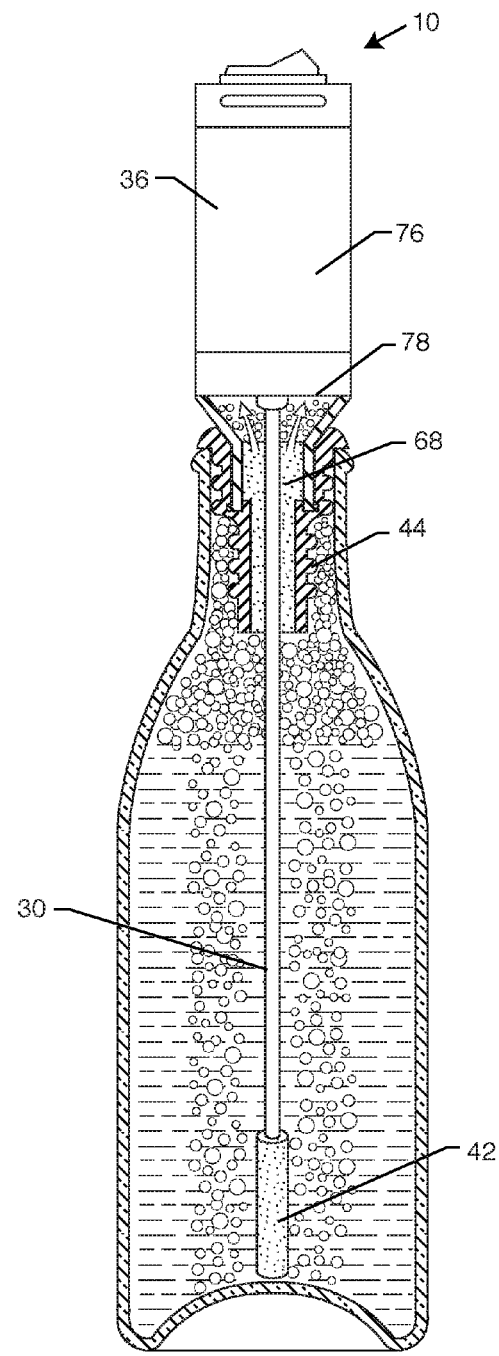
FIG. 15B is a view similar to FIG. 15A now showing the aerator in action.

FIGS. 15A and 15B illustrate that the aerator 10, previously illustrated in FIGS. 14 through 14G, can be integrated by removal of the extension, gas conduit 31. In the previous embodiments, the extension, gas conduit 31 is typically a small clear flexible hose. In FIGS. 15A and 15B, gas conduit 30 extends directly below the air pump 36. Air pump 36 is configured to be sealed directly into the top of the wine bottle and also provide a housing for bubble-reducing, aeration element 68 along with an extension, expansion chamber 13.

FIG. 15B shows the pump in operation with bubble formation, wherein the bubbles break up in the bubble-reducing filter element 68 and only a few bubbles appear on the top surface of filter element 68. In this embodiment, there is an upper housing 76 of air pump 36 that is removable from the lower housing 78, which includes the gas conduit 30 and the aeration element 42. This can be a quick disconnect, including a snap, a screw or a friction fit assembly. First, the upper element 76, which includes electrical components including a switch, a battery and an air pump is removed from the lower unit 78, which includes the gas conduit 30 and the aeration element 42. The lower unit 42, 30, 78 can then be washed in a sink or put in the dishwasher. This protects sensitive electrical components from being exposed to water and allows all the important parts that have come in contact with wine to be cleaned properly and safely.

Figure 16:
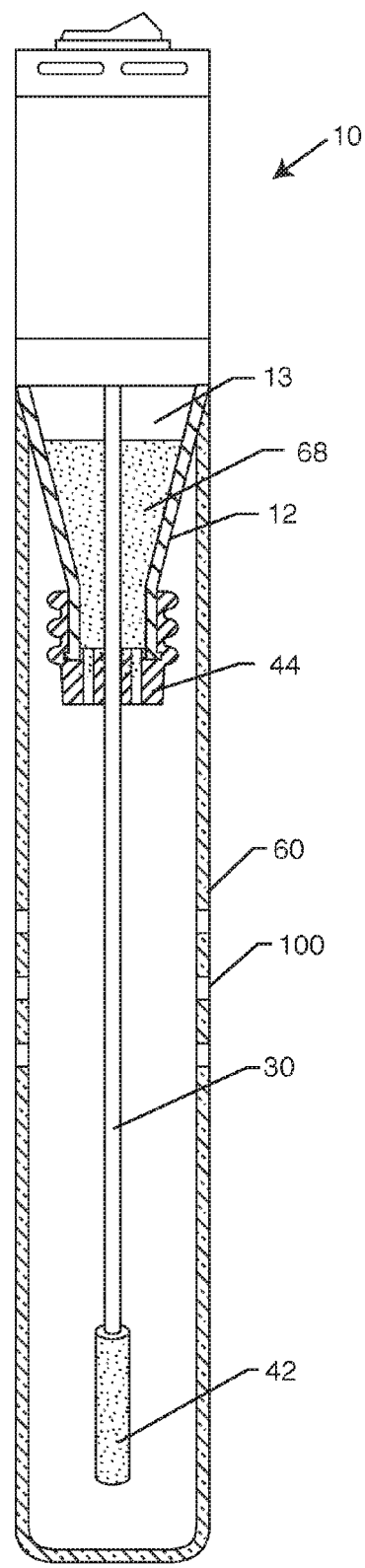
FIG. 16 is a sectional view of another exemplary embodiment of the aerator of FIGS. 15A and 15B now with a case.

FIG. 16 illustrates a storage case 60, which allows the aerator assembly 10 (previously described in FIGS. 15A and 15B) to be safely stored in a drawer, a cabinet, purse, briefcase, pocket or the like. In some embodiments of the invention, the gas conduit 30 could be of a flexible plastic or polyurethane tubing. In other embodiments, it may be rigid stainless steel or even glass. Accordingly, it is important to protect it from damage, particularly during storage or transport. Also, the aeration element 42 can be damaged by coming into contact with other hard objects. Accordingly, the storage case 60 is important to protect the sensitive elements of aerator 10. The storage case 60 may be perforated with many fine holes 100 to facilitate an air exchange. These holes 100 are optional and the case 60 can be designed to include or not include these holes 100. The holes 100 are important if the wine aerator is put away wet so that it can properly dry while it's in a drawer or a cabinet.

Figures 17A, 17B:
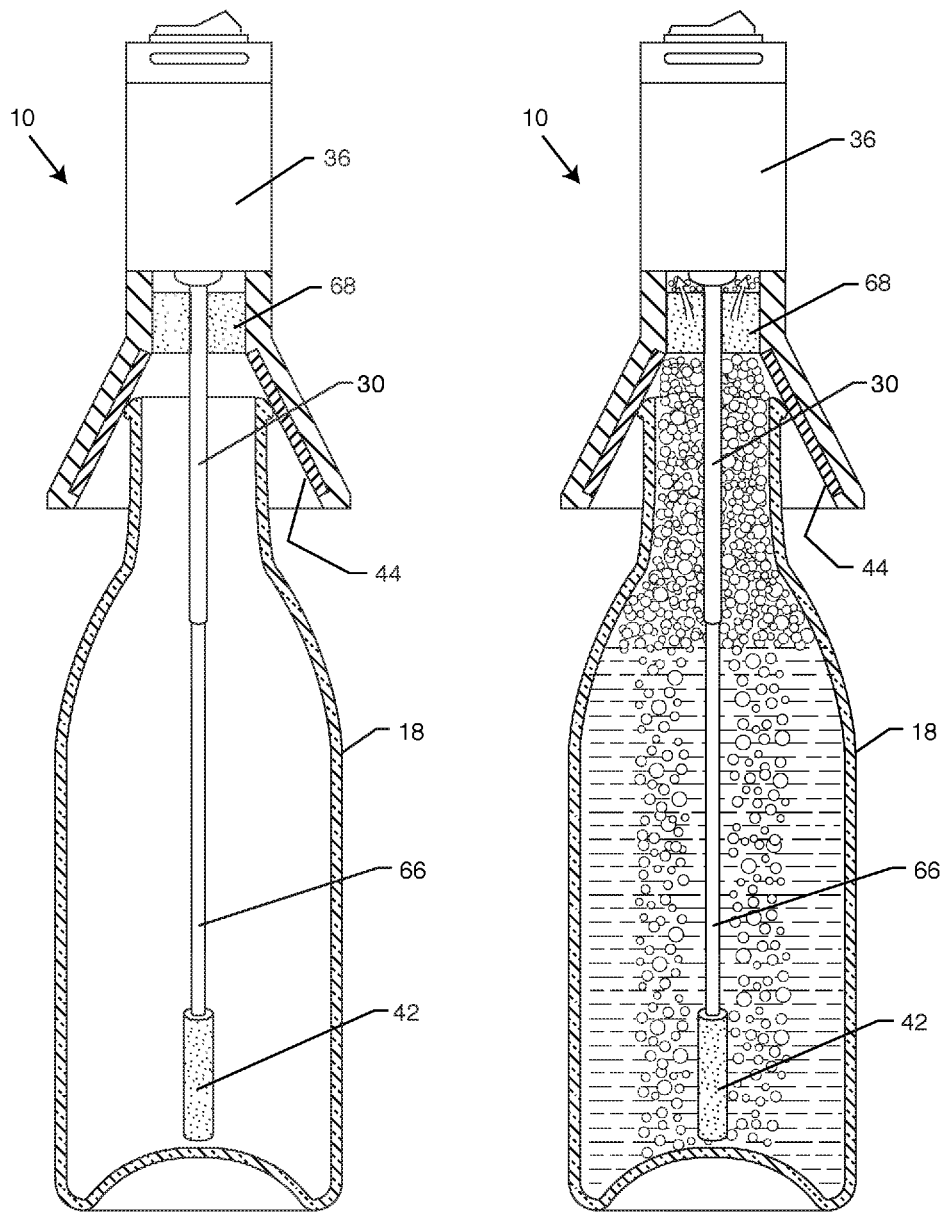
FIG. 17A is a view similar in structure to FIG. 15A where now the sealing element seals to the outside of the wine bottle.
FIG. 17B is a view similar to FIG. 17A now showing the aerator in action.

FIGS. 17A and 17B illustrate a different sealing arrangement where seal 44 (flexible rubber, silicone or the like) presses down against the top of the wine bottle. Sealing is accomplished by the weight or the gravitational attraction of the air pump 36. Additional sealing may be easily accomplished by the operator simply grasping the pump body 36 with his or her hand and simply pushing down against the wine bottle. It would be very easy to grasp this structure to create additional sealing force. As shown in FIGS. 17A and 17B, it is optional to have the telescoping gas conduit 66 that can be reduced in length to fit inside the gas conduit 30. As it understood by those skilled in the art, the telescoping feature of the gas conduit 30 and 66 can be applied to any of the embodiments shown or taught herein.

Figure 18:
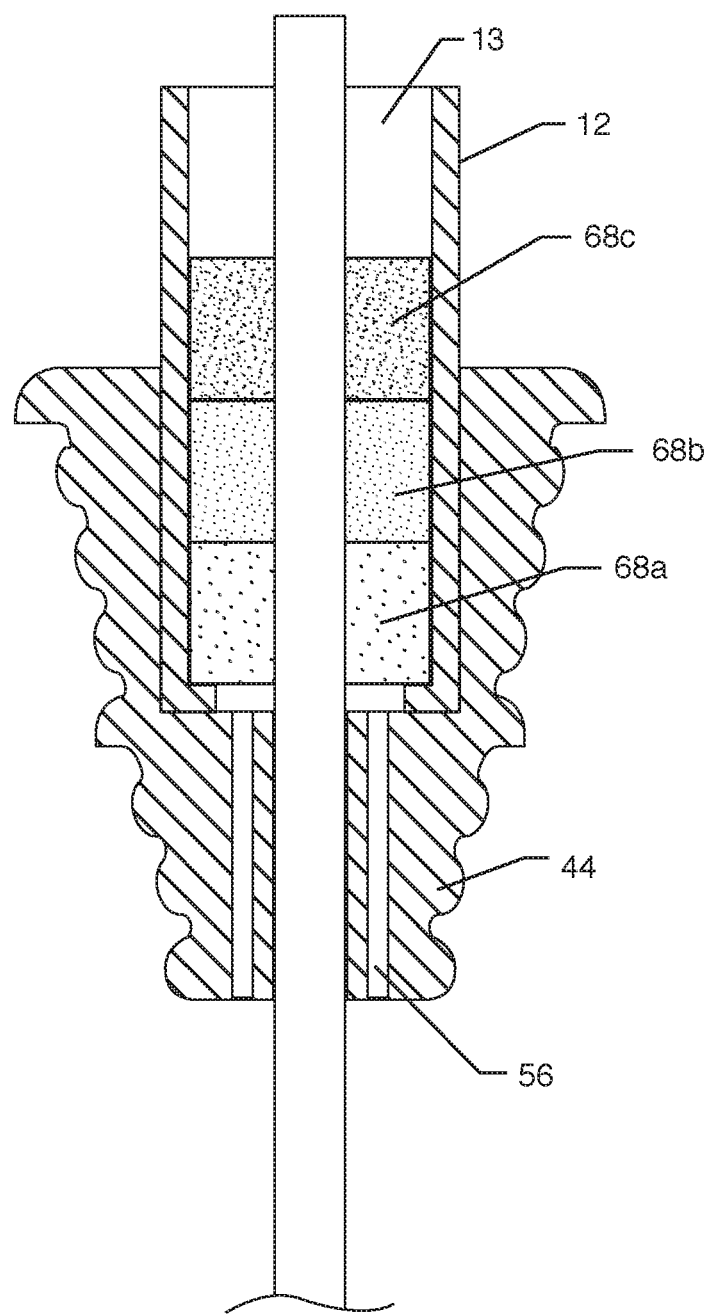
FIG. 18 is a sectional view of another exemplary embodiment of the bubble-reducing, aeration element.

FIG. 18 illustrates a graduated diameter sealing element 44 so that the present invention will fit in various sizes of wine bottles or containers. Referring once again to FIG. 18, one can see that the bubble-reducing, filter element 68 has been broken up into an element 68a, 68b and 68c. This shows that the bubble-reducing, filter element 68 may be graduated such that it starts with coarse filtering, then medium filtering and then fine filtering; thereby breaking up wine air bubbles such that they will turn to a liquid and flow back down through passageways 56. It will also be understood by those skilled in the art, that one could flip the arrangement, as illustrated in FIG. 18. In other words, element 68a could appear on top and 68c could appear on the bottom. One will also understand that 1, 2, 3 . . . or even "n" different filter elements 68 can be stacked up in the present invention, all with varying mesh densities.

Figure 19:
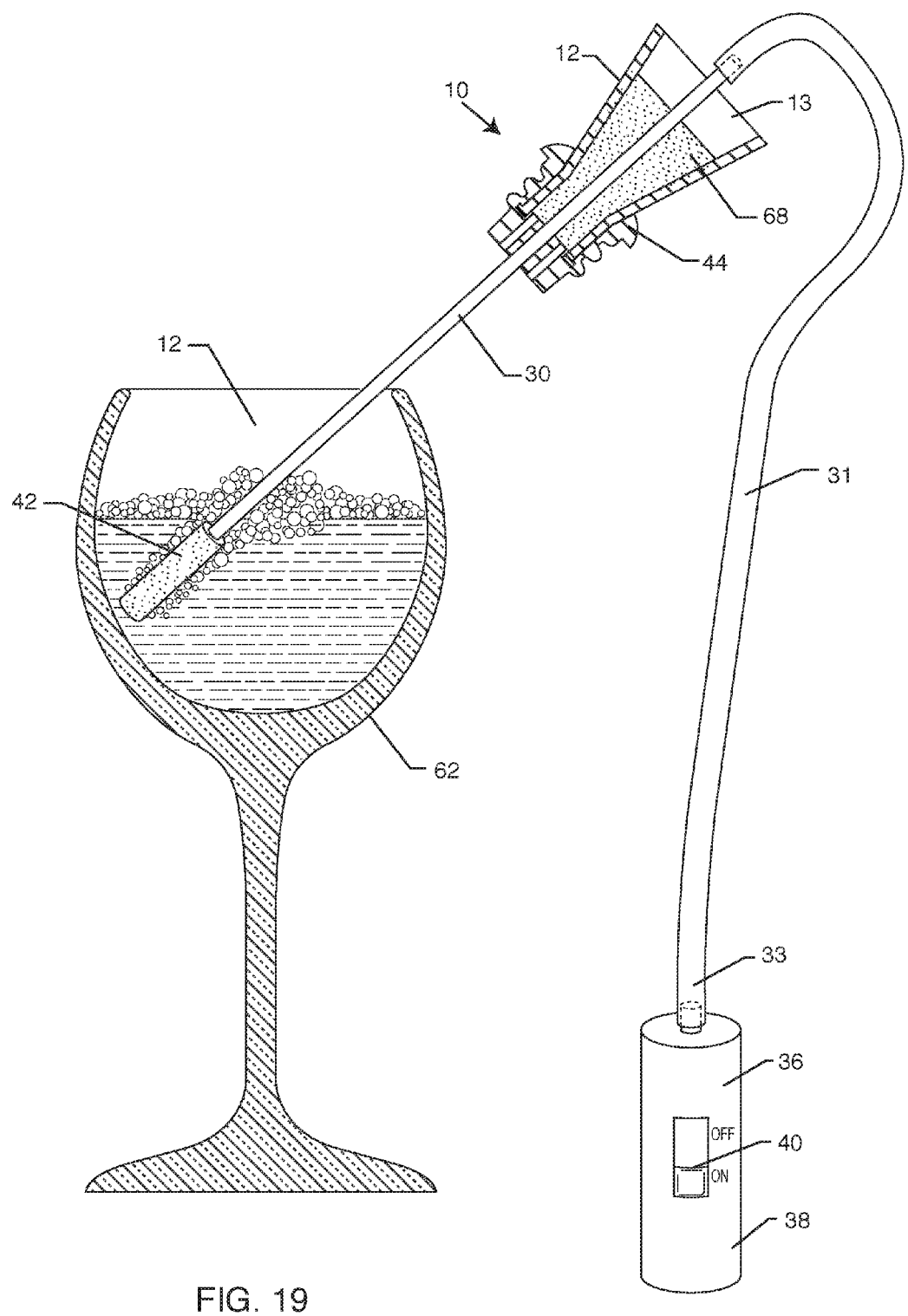
FIG. 19 shows the structure of FIG. 14 aerator a wine glass instead of a wine bottle.

FIG. 19 illustrates that the novel aerator 10, as previously illustrated in FIGS. 14 through 18, which embodies both a distal aeration element 42 and a bubble-reducing, filter element 68, can also be used directly to aerate wine in a wine glass (or other container) 62. The wine glass 62 is, in general, not filled all the way to the top with wine. This provides a natural retention element 12 for the wine bubbles, as shown. Referring to FIG. 19 and all of the other figures of the present invention, it will be appreciated that in any embodiment, variable speed and variable time aspects, as described in FIGS. 14A through 14C, may be incorporated.

Figure 20:
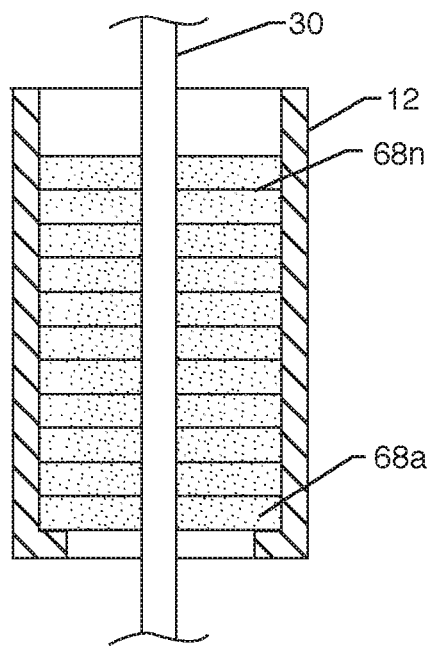
FIG. 20 is a sectional view of another exemplary embodiment of the bubble-reducing, aeration element.
Figure 21:
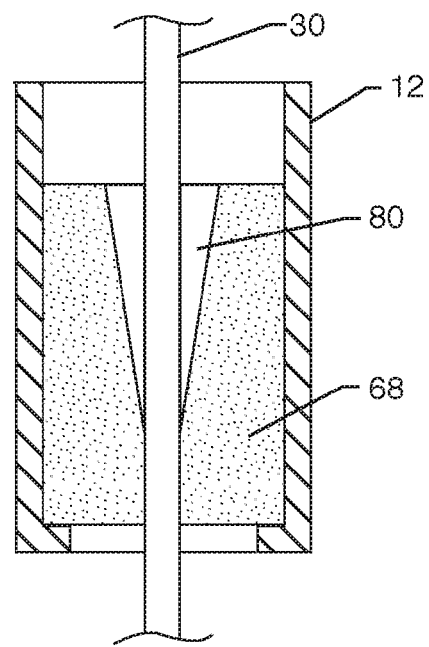
FIG. 21 is a sectional view of another exemplary embodiment of the bubble-reducing, aeration element.

FIGS. 20 and 21 illustrate alternative embodiments for the bubble-reducing, filter element 68, as previously described in FIG. 14 and on. FIG. 20 illustrates that element 68 can have any number of individual layers that are physically laid together, co-bonded, press-fit or the like.

FIG. 21 illustrates that the bubble-reducing, filter element 68 has been modified to include a retention area 80 where the air bubbles can collapse back into a liquid and filter back down through element 68 and thereby return to the bottle (not shown). It will be appreciated that the cross-section of the retention area 80 appears triangular in FIG. 21 but in reality is a frustoconical shape, which means it takes the shape of a cone or frustum. It will also be appreciated that this retention area 80 can take many shapes including rectangular shapes, semi-circular shapes or the like.

Figure 22:
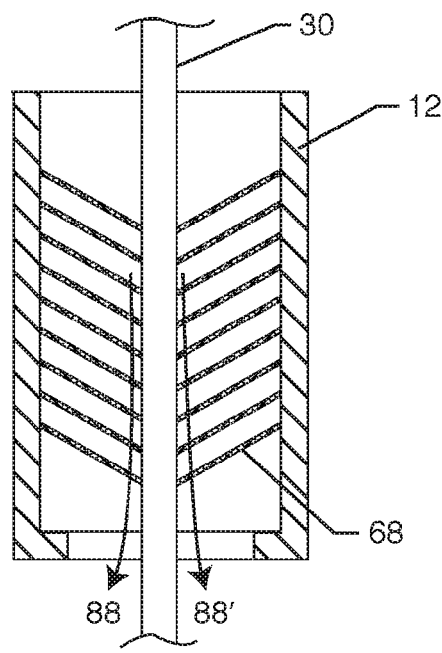
FIG. 22 is a sectional view of another exemplary embodiment of the bubble-reducing, aeration element.

FIG. 22 illustrates that bubble-reducing, filter element 68 may be disposed as plates separated by an air space. In FIG. 22, they are shown angled downward to facilitate the breaking up of bubbles creating liquid flow paths 88 and 88' thereby returning a liquid back into the wine bottle.

Figure 23:
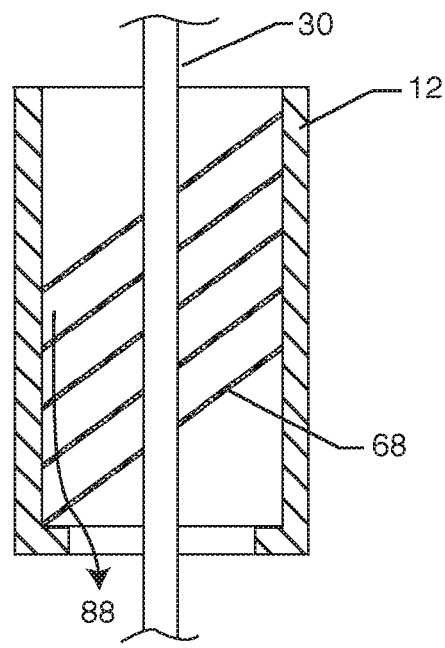
FIG. 23 is a sectional view of another exemplary embodiment of the bubble-reducing, aeration element.

An alternative embodiment of FIG. 22 is shown in FIG. 23, wherein the plate 68 are angled to one side for the same purpose to collect the dissipating wine bubbles and form a liquid return flow path 88.

Figure 24:
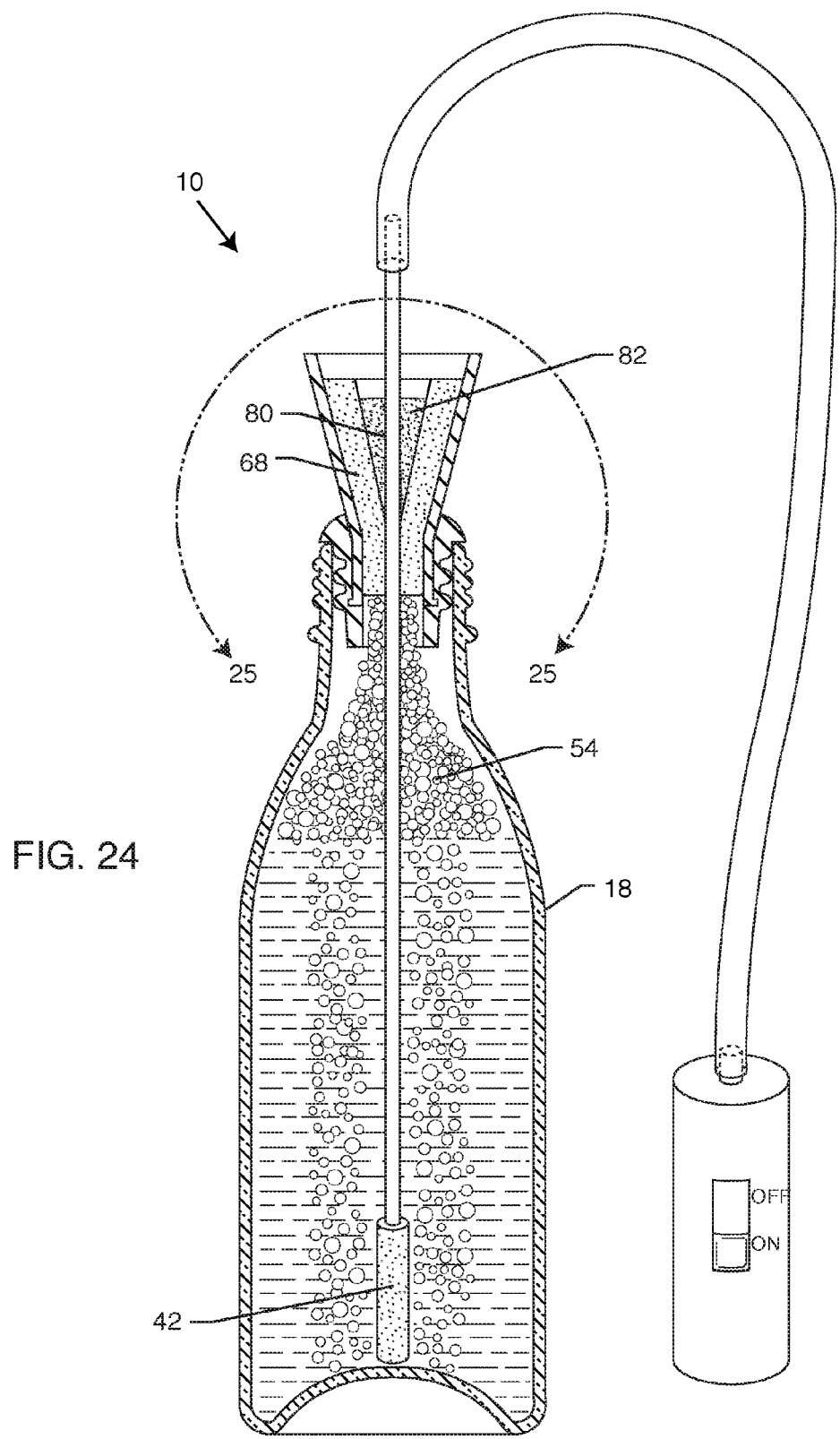
FIG. 24 is a sectional view of another exemplary embodiment of the bubble-reducing, aeration element with a retention area in action.

FIG. 24 illustrates the bubble-reducing, filter element 68 of FIG. 21 in operation. One can see that the aeration element 42 is producing many bubbles 54 of varying sizes. After passing through the bubble-reducing filter element 68, one can see that the retention area 80 of FIG. 21 fills up with some very fine bubbles 82. These fine bubbles 82 are in the process of breaking back down into a liquid where they can flow back through element 68 and return to the wine bottle.

Figure 25:
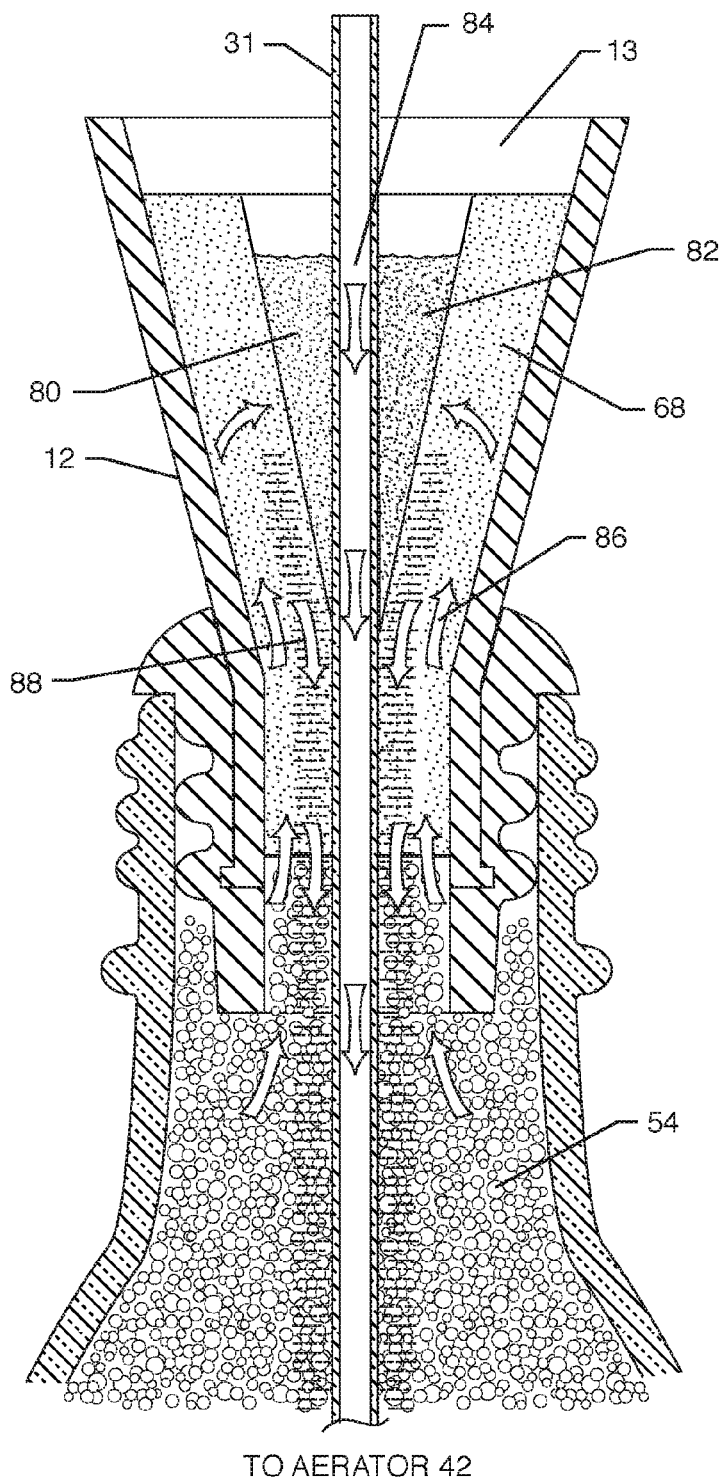
FIG. 25 is an enlarged view of the structure of FIG. 24 taken along lines 25-25.

FIG. 25 is a blown-up section taken from 25-25 from FIG. 24 and illustrates the process of the bubbles 54 passing through filter element 68. Referring once again to FIG. 25, one can see there is an upward flow 86 of wine bubbles that are broken up and dissipated in the bubble-reducing, filter element 68. These bubbles emerge as either a liquid or very fine bubbles 82 within the retention space 80. The upward flow of bubbles 86 is generated by the downward flow of air 84 within the gas conduit 31 (to aeration element 42 not shown). As the tiny wine bubbles 82 break up into a liquid, there is a gravitational flow 88, which allows the liquid to return back to the wine bottle thus creating a steady state process. A steady state process is easy to accomplish by the variable flow rate device, as previously described as FIGS. 14-14G. The retention chamber 13 is important as a safety device because if wine bubbles start to appear there, then one turns down the flow rate. The open end shape of the retention chamber 13 is also particularly important because it allows for easy visualization of the process. In other words, depending on the viscosity of the wine, one simply adjusts the flow rate until they start to see a few bubbles in the retention chamber 13 and then turn it down slightly. All one has to do then is wait for a time until the wine reaches the proper taste. It is noted herein that the gas conduit 31 is now shown with a wall thickness. It is understood that for the other views in this application the gas conduit 31 does not show its wall thickness for the sake of simplicity as adding the wall thickness for all views would overly crowd the figures.

Figure 26:
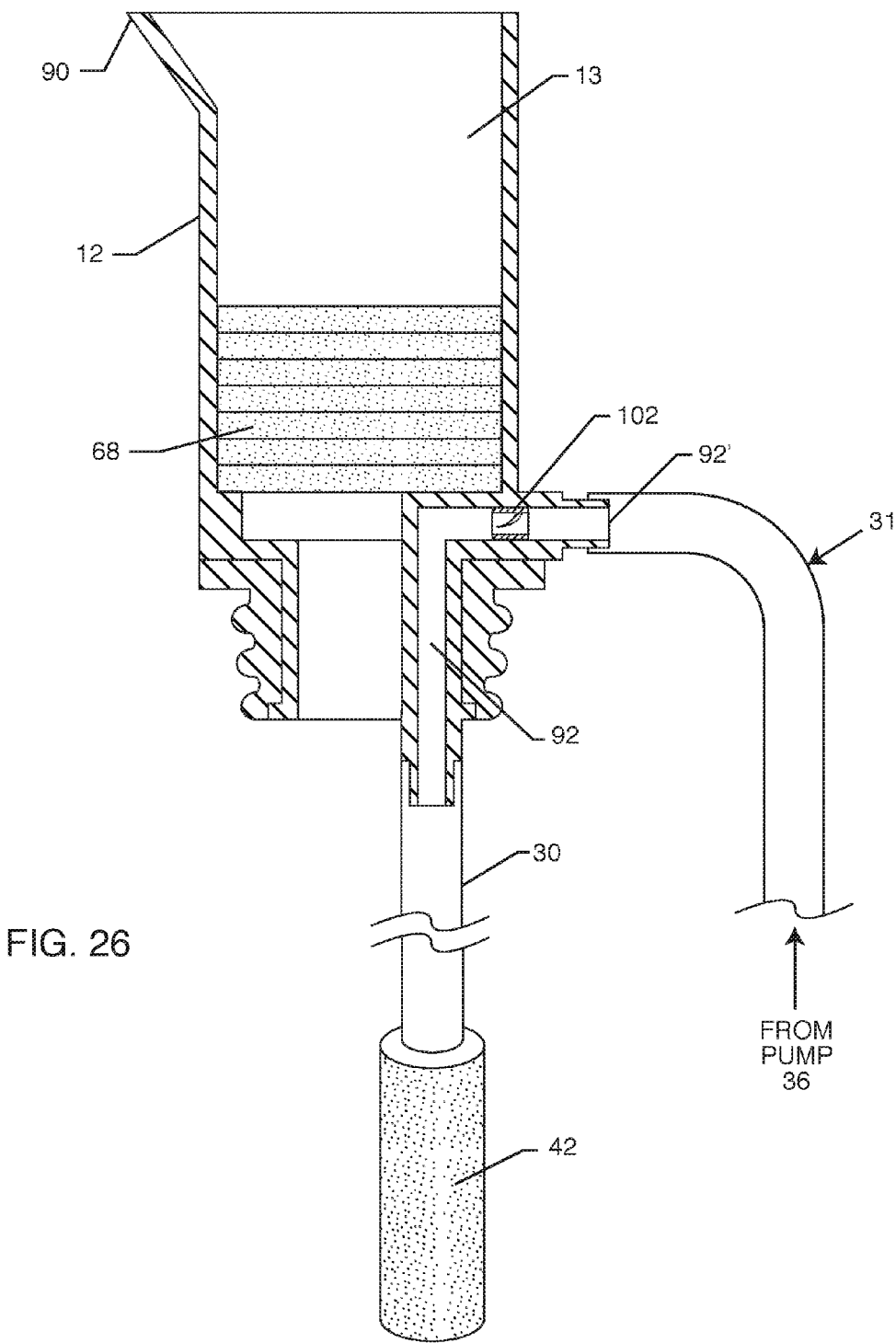
FIG. 26 is a sectional view of an exemplary housing for the bubble-reducing, aeration element.

FIG. 26 illustrates an L-shaped air/gas conduit 92 which is connectable to extension tube or tubing 31 and also to the gas conduit 30. As illustrated, the air/gas conduit 30 is directed to the distal end aeration element 42, which produces the multiplicity of bubbles. The extension, gas conduit 31 is connectable to pump 36 (not shown). An advantage to this is that the L-shaped conduit 92 and the retention chamber 12 along with the housing for the bubble-reducing, aeration element 68 could all be formed in a single injection-molding process. This has the advantage of greatly reducing the cost of the assembly. Additionally, the assembly of FIG. 26 can be left in place in the wine bottle simply by pulling off the extension, gas conduit 31. Element 90 then becomes a convenient pour spout. A one-way air valve 102 can be installed in the L-shaped conduit 92 so that when pouring wine the wine does not flow back out. Alternatively, upon removal of extension, gas conduit 31, a cap could be placed over the area 92' of the L-shaped conduit 92. This little silicone, rubber or other material cap would prevent wine from inadvertently flowing out port 92' during the pouring process.

Figure 27:
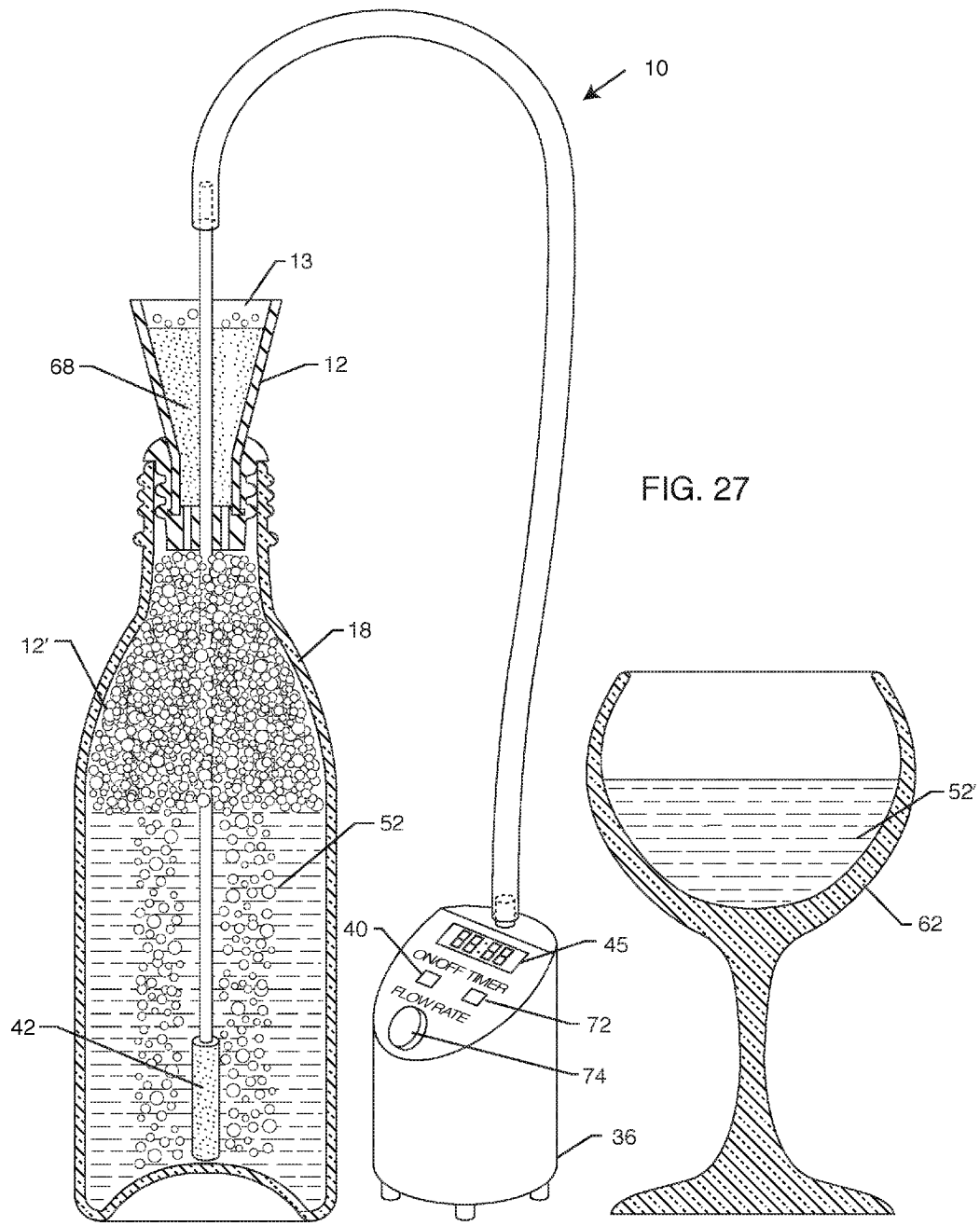
FIG. 27 shows a sectional view of a bottle, glass and novel aerator of the present invention being used in practice.

FIG. 27 illustrates a likely real-world embodiment of the present invention incorporating a distal aeration element 42, an optional proximal bubble-reducing, aeration filter 68 and a proximal air pump (gas pump) 36. In this case, the wine bottle has had its cork removed (or unscrewed) and a volume of wine 52' has been poured into a wine glass 62. The level of the wine 52' approximately fills half of the wine glass. By removing this quantity of wine from the wine bottle, this creates an additional bubble retention space 12'. This allows the operator or user to operate the pump at a higher speed (for example, the high setting, as previously illustrated). After the operator is done aerating the wine in the wine bottle, then a second step is necessary. That is where the operator would place the aerator element 42 in the wine glass and also aerate that quantity of wine. This was previously described in FIG. 19.

Referring once again to FIG. 27, one can understand that the bubble-reducing filter 68 and its housing 12 are not necessarily needed. This is because with the flow rate adjustment knob 74, one can adjust the flow of air bubbles out of aeration element 42 until an equilibrium status is reached with the bubbles just below the neck of the wine bottle so that they will not flow out and make a mess. Then, after the wine bottle itself is aerated, one can simply move the aeration element 42 into the bottom of the wine glass 62 and also aerate that volume of wine 52'.

As can be seen in FIG. 27, the air pump 36 has taken a more consumer friendly shape. The flow rate adjustment knob 74 allows the user to quickly make large and small adjustments that can account for a variety of factors that would affect the rate of bubble generation. It is understood that the air pump 36 can take many shapes and configurations shown in this application and even others not shown, without departing from the scope of this teaching.

Figures 28, 28A, 28B:
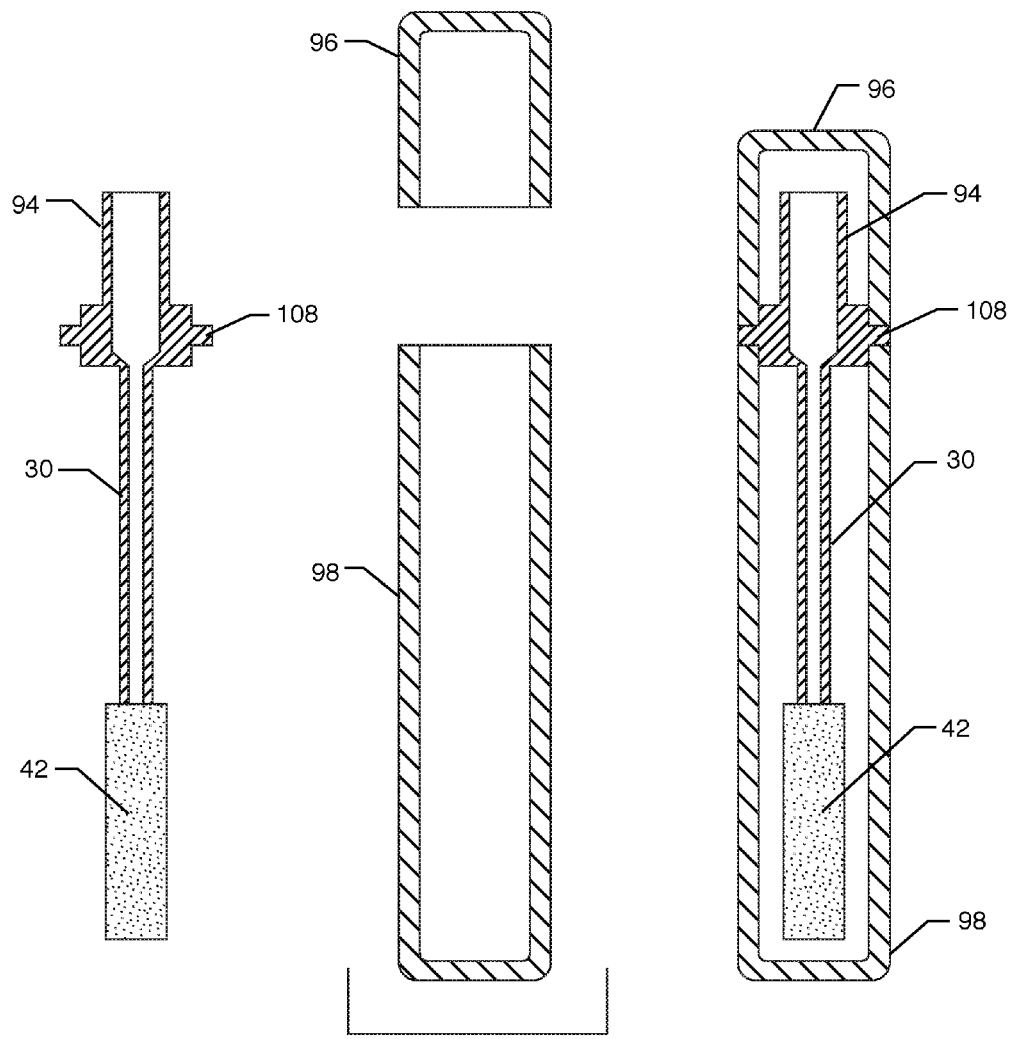
FIG. 28 is a sectional view of a simplified aerator of the present invention.
FIG. 28A is a sectional view similar to FIG. 28 now showing an upper and lower case.
FIG. 28B is a sectional view of an assembled version of the simplified aerator of FIGS. 28 and 28A.

FIG. 28 illustrates a highly simplified version of the aeration invention. As before, there is a distal aeration element 42 and there is also a gas conduit 30. Element 94 is a blow port, which conveniently fits the human mouth. One simply drops the distal aeration element 42 into a bottle or glass of wine and blows in a few breaths thereby aerating the wine.

FIG. 28A illustrates and upper 96 and lower casing 98 so that the manually blow port version of FIG. 28 can be stored and carried, for example, in luggage, in a pants pocket, shirt pocket, purse or the like.

FIG. 28B illustrates the blow port version of FIG. 28 stored within the upper 96 or lower 98 storage container portions of FIG. 28A. The top portion of the storage element 96 can be affixed to the bottom portion of the storage element 98 either by press-fitting, a screw together mechanism (not shown) or a snap together mechanism (not shown). In the press-fit version, the top portion 96 is pressed down against the seating area 108 of the mouthpiece. The bottom portion 98 is then inserted or press-fitted against the lower portion of flange 108. In an alternative embodiment, the flange portion 108 could be eliminated and the top portion 96 could be directly affixed to the bottom portion 98 either through a press-fit, screw or snap configuration.

Figure 29:
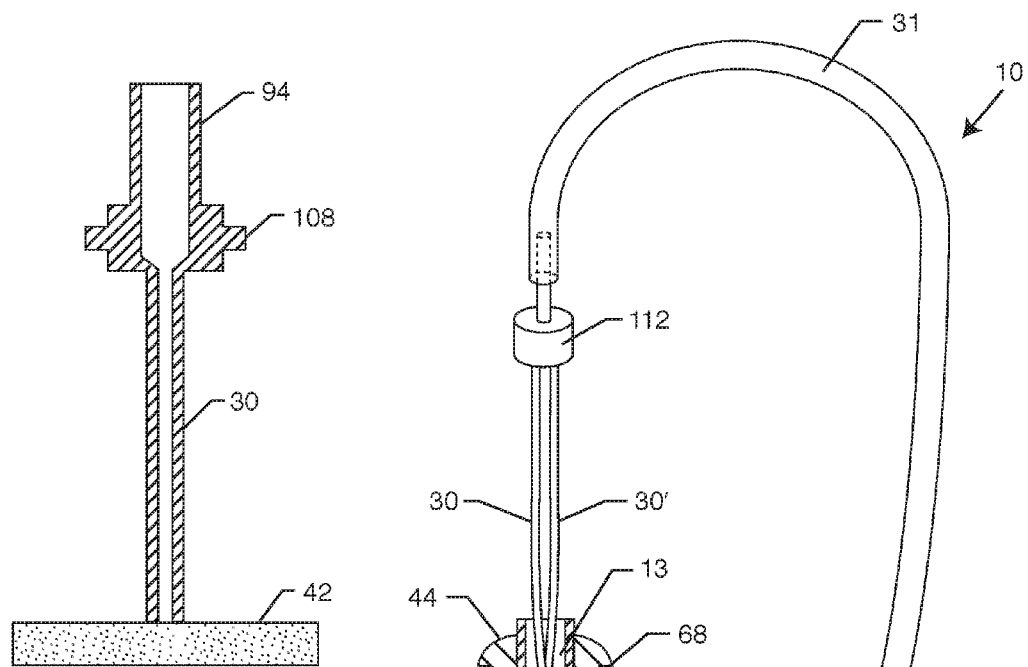
FIG. 29 is a section view similar to FIG. 28 now showing a new embodiment of an aeration element disposed in a horizontal direction.

FIG. 29 is similar to FIG. 28 but now the aeration element 42 is a circular disc. In many of the embodiments shown and described herein, the aeration element 42 was very narrow as it was depicted being taller than it was wider. This could have the problem of only aerating the wine which was close to the aeration element 42. Therefore, the embodiment shown in FIG. 29 has an increased diameter such that it would aerate a wider portion of the wine whether it was in a glass or in the bottle. The inventor's believe that it may be beneficial to create a turbulent flow as compared to a laminar flow for aerating the wine with bubbles. Therefore, it is desired that the Reynold's number is increased to help the exchange of oxygen with the wine.

Laminar flow is the orderly flow of tiny particles (or, in the case of this invention, bubbles) along a thin line, whereas turbulent flow is more chaotic and results in the particles (bubbles) being dispersed throughout a larger area. Turbulent flow will reduce the thickness of the boundary layer, which is material against the wall of the container in which there is limited movement and therefore would have reduced interaction with the bubbles. Increasing the diameter in which the bubbles are added to the container (whether it be the wine glass or the wine bottle) will inherently reduce the thickness of the boundary layer as it will ensure a greater diameter of the column of fluid is seeded with the gas bubbles. Adding bubbles in a wider array and at various positions will also increase the turbulence in the system as the bubbles interact with the wine fluid and each other and aerate the wine in a more expedient manner.

Therefore, changing the aeration element 42 from a vertical orientation to a horizontal orientation will increase the diameter of the column of bubbles, thereby increasing the exchange of oxygen with the wine. This is best shown in FIG. 29. It will be understood to those skilled in the art that this concept can be applied to any of the wine glass embodiments shown and/or described in this specification.

Figure 30:
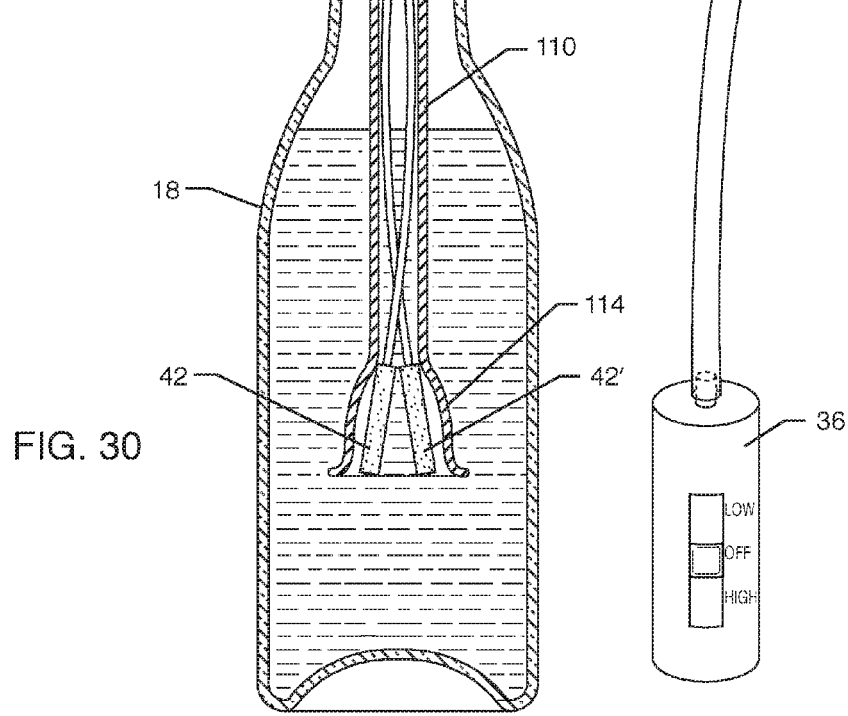
FIG. 30 is a sectional view of another exemplary embodiment of a multitude of bubble-generating aeration elements disposed in a housing.
Figure 31:
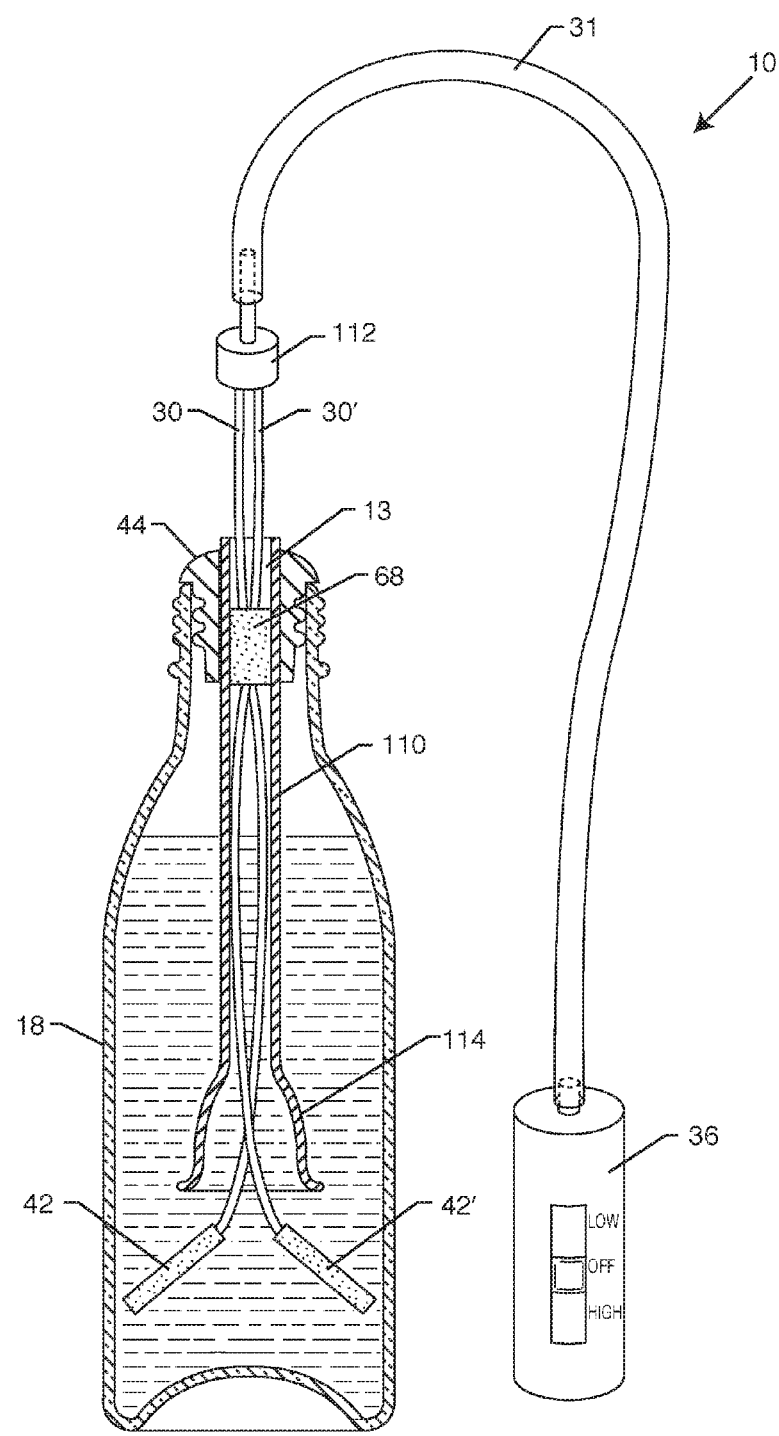
FIG. 31 is a view similar to FIG. 30, now showing the bubble-generating aeration elements extended and turned.
Figure 32:
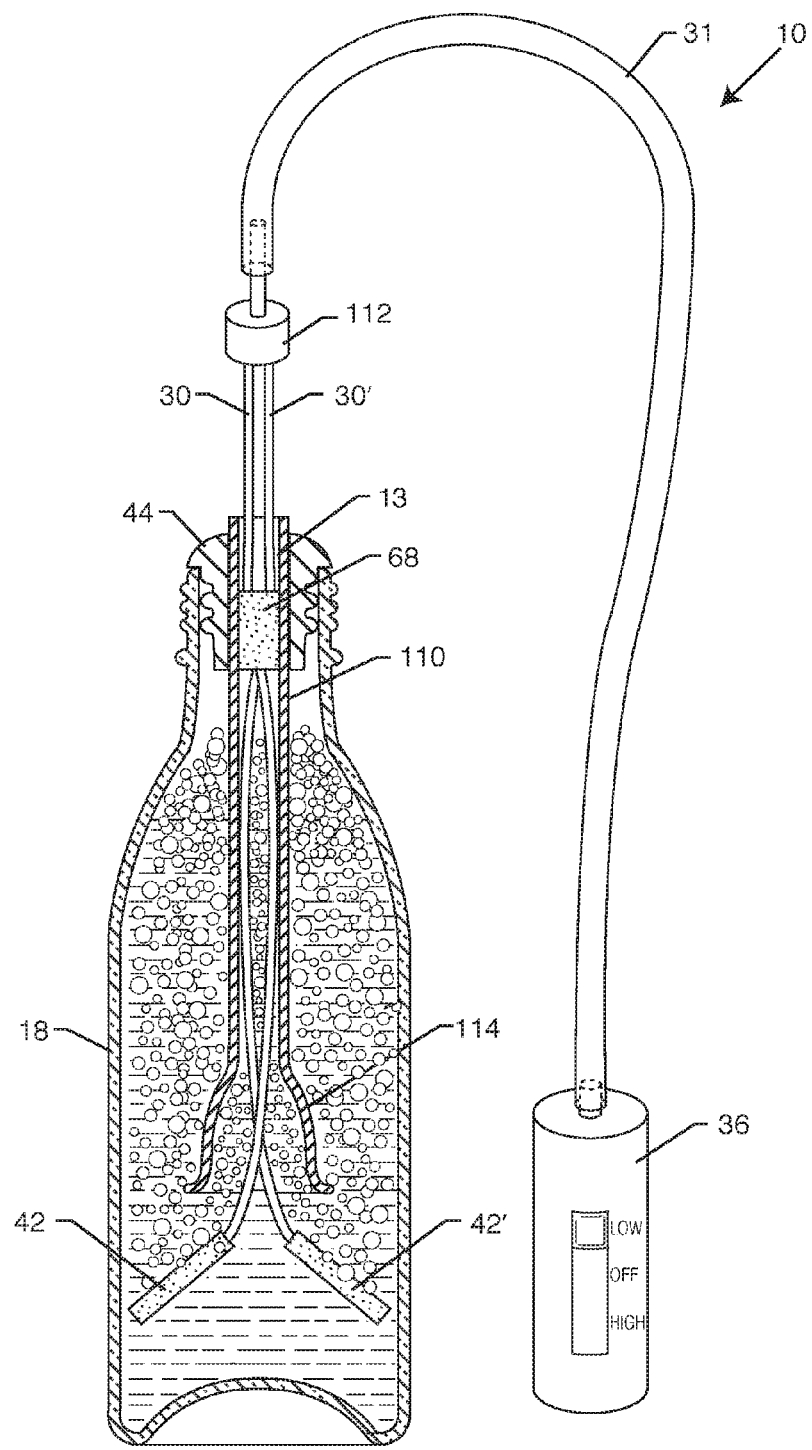
FIG. 32 is a view similar to FIG. 31, now showing the bubble-generating aeration elements aerating a larger portion of the wine inside the bottle.

FIGS. 30, 31 and 32 illustrate yet another embodiment where a multitude of aeration elements 42 may be used, whether two aeration elements are used as depicted herein or any number "n" of aeration elements. In these embodiments the gas conduit extension may have a branch fitting 112 that has one inlet but may have 2, 3 . . . or n outlets. This facilitates a multitude of gas conduits 30 and 30' that are then connected to their respective aeration elements 42 and 42'. As shown herein, the gas conduits 30 and 30' are flexible, or are made from a resilient material that has an inherent bend or change of direction. A housing 110 keeps the gas conduits 30 and 30' aligned when the aeration elements 42 and 42' are retracted within the housing 110 as shown in FIG. 30.

As shown in FIG. 31, when the aeration elements 42 and 42' are extended beyond the housing 110, they will naturally bend outwards due to the inherent bend or bias manufactured into the gas conduits 30 and 30'.

FIG. 32 shows that when the air pump 36 is activated, the column of bubbles within the bottle cover a larger amount of area as compared to previous designs. The distal end of the housing 110 can also be advantageously contoured and/or bent at location 114 to help the aeration elements 42 and 42' extend and retract in a smooth and efficient manner.

FIGS. 30, 31 and 32 also show the bubble-reducing filter element 68 disposed within the housing 110. The area above the bubble-reducing filter element 68 can act like the small expansion chamber 13. Furthermore, it is understood by those skilled in the art that the bubble-reducing filter element 68 could optionally be removed.

Figure 33:
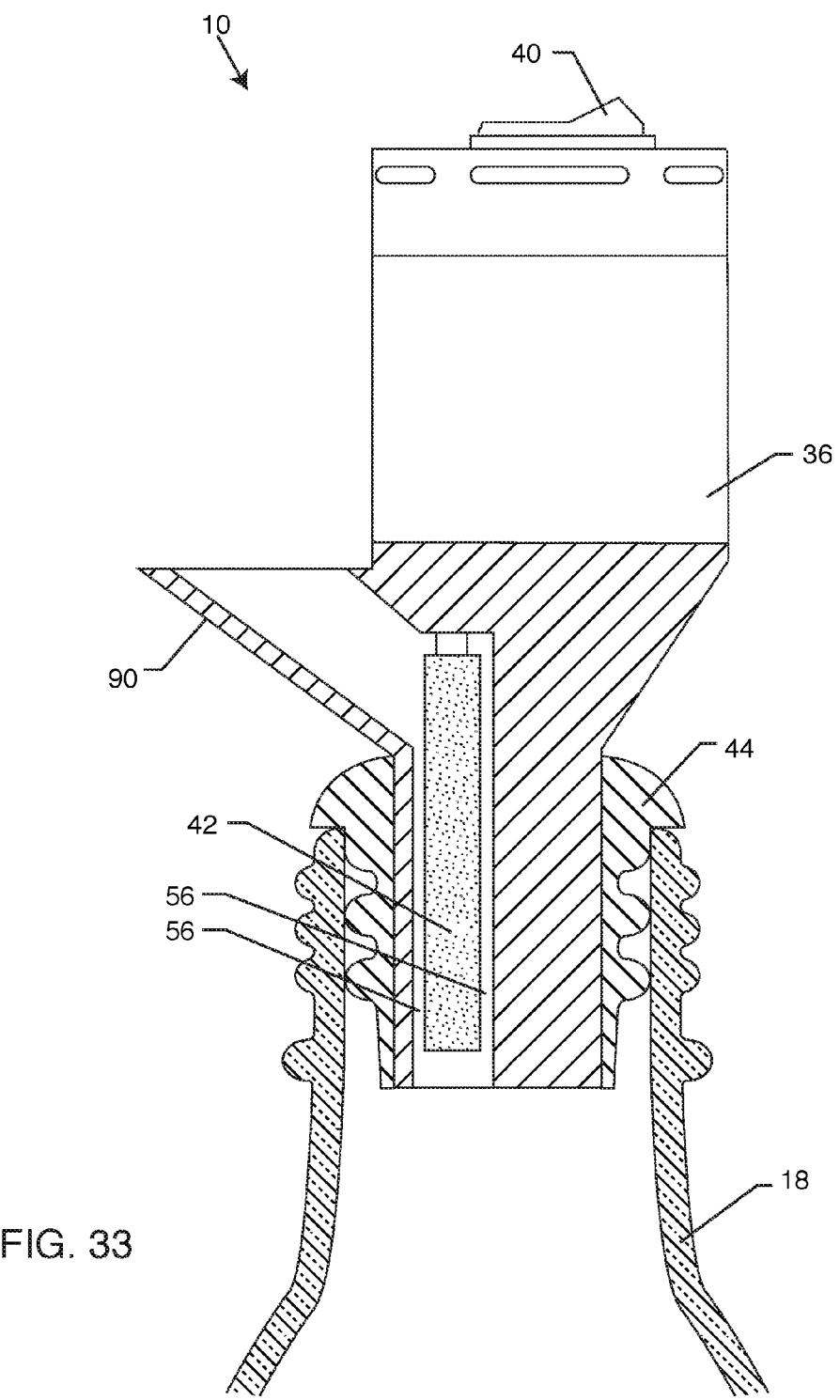
FIG. 33 is another embodiment of a wine aerator where the bubble-generating aeration element is integrated into a pouring spout.

FIG. 33 is another embodiment of the aerator assembly 10. Here, the filter element 42 has been integrated into the upper portion of the aerator 10. In this embodiment the aeration element 42 doesn't extend into the wine in the bottle 18. Rather, the pump 36 is turned on when one is about to pour from the bottle 18. As wine is poured out through the pour lip 90, the wine passes through narrow passageways 56 that are in close proximity to the aeration element 42. In this way, wine is forced to interact with bubbles that are being generated while the pouring is taking place. Therefore, a multitude of bubbles can be captured by the empty space of the glass it is being poured into.

Figure 34:
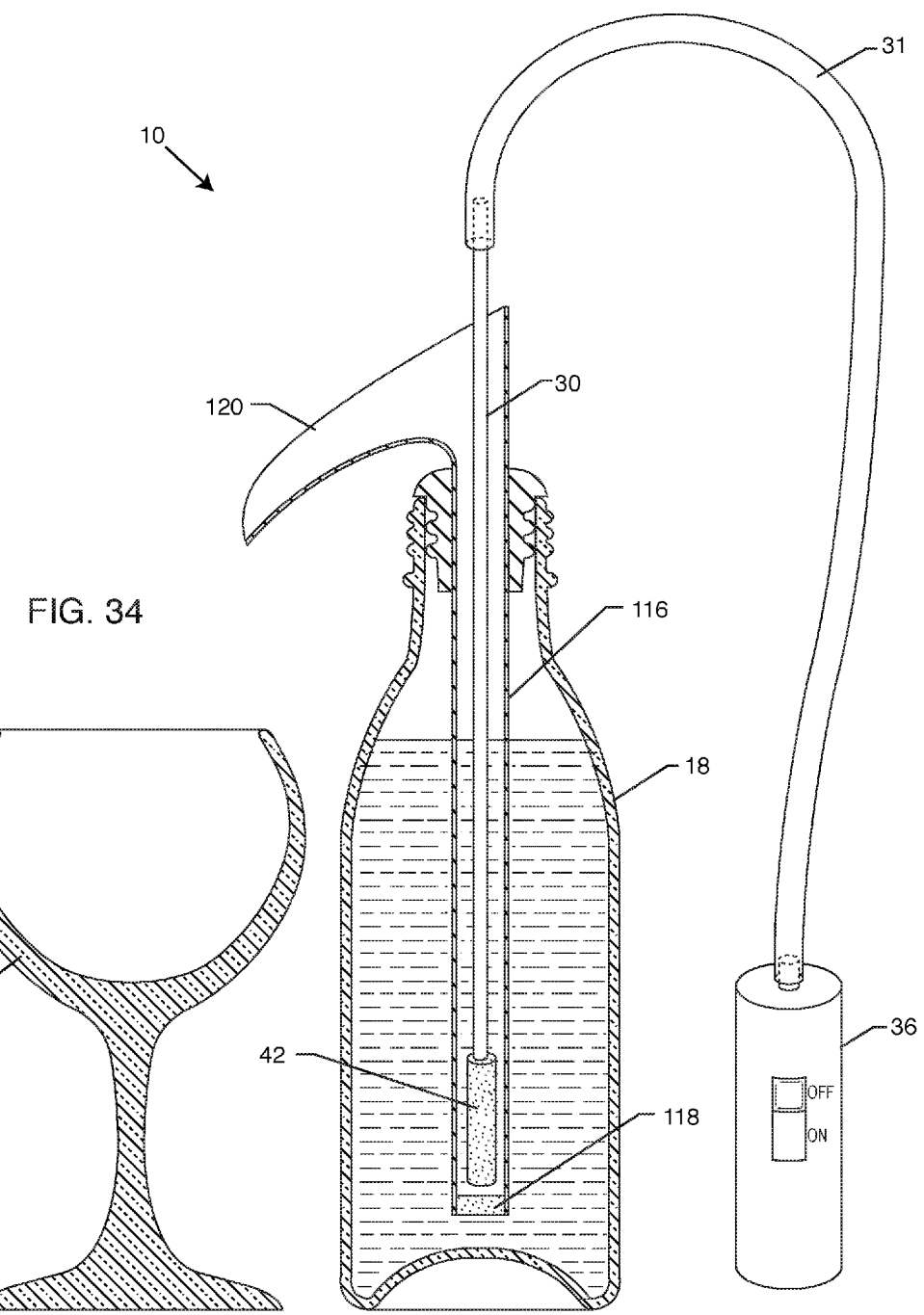
FIG. 34 is another embodiment of a wine aerator where now the bubble-generating aeration element is enclosed within a liquid-permeable housing configured to channel bubbles upward when in use.

FIG. 34 is another embodiment of a wine aerator where now the bubble-generating aeration element 42 is enclosed within a housing 116. The housing 116 has an optional sediment filter 118 that allows the wine to pass through, making it liquid-permeable, but which prevents any sediments from also passing through. Optionally, the sediment filter 118 could be removed and/or the bottom of the housing 116 could include a plurality of fine holes sized to allow wine to pass through but small enough to stop large sediment particles. When the housing 116 is fitted into the bottle, the housing is configured to channel bubbles upward when in use.

Figure 35:
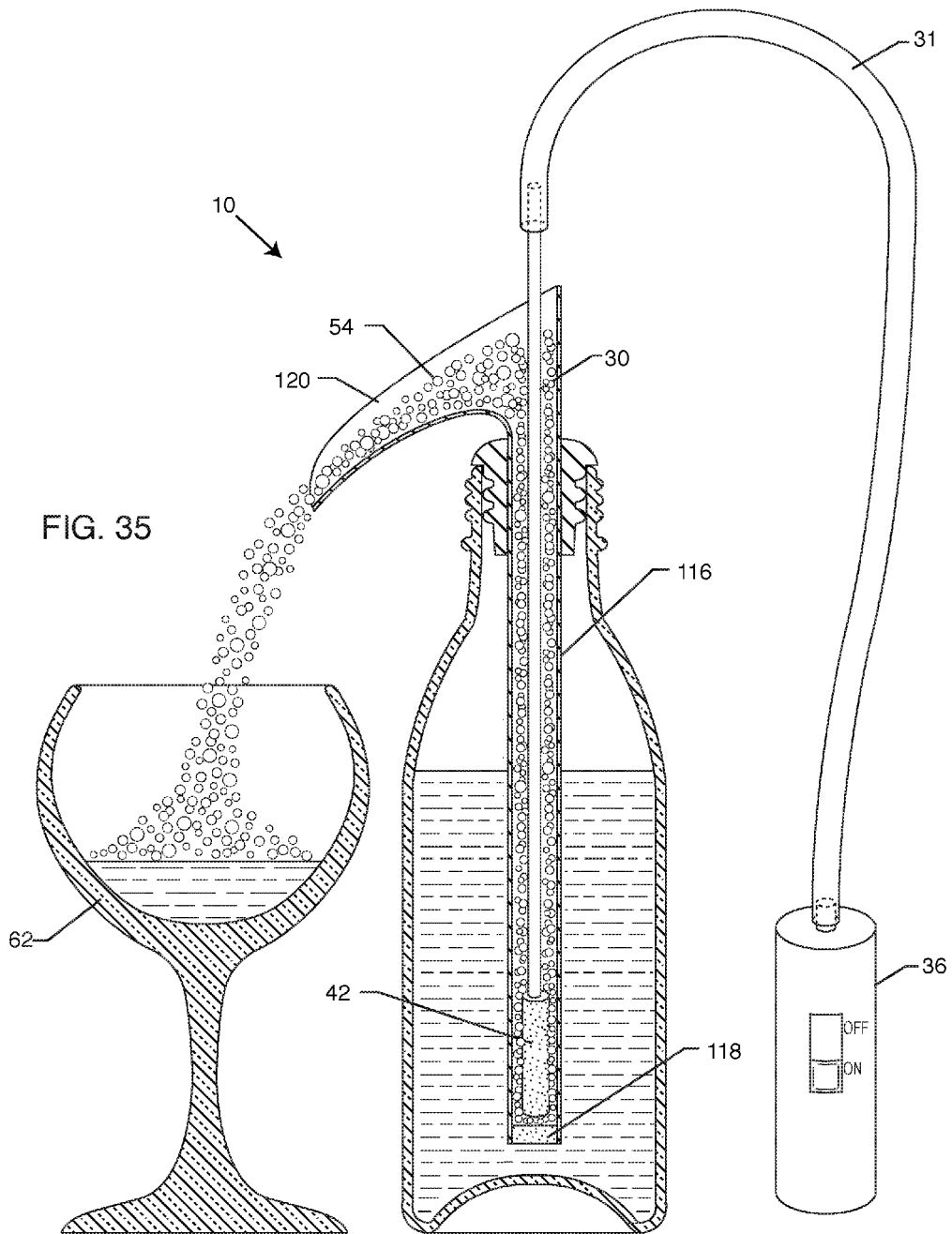
FIG. 35 is a view similar to FIG. 34 now showing how the bubbles will move upwardly through the housing and pour out of the spout into a wine glass.

FIG. 35 is a view similar to FIG. 34 now showing how the bubbles 54 and/or wine will move upwardly through the housing 116 and pour out of the pour spout 120 into the wine glass 62. As can be understood, one would activate the air pump 36 and the bubbles 54 and/or wine would naturally rise through the housing 116 and be channeled into the wine glass 62. This process could occur without the user having to tip the bottle and instead the bottle could remain upright and the wine glass 62 strategically placed below. The wine that would reside in the wine glass 62 could be fully aerated as it was fully comprised of aeration bubbles 54 and/or aerated wine.

Figure 36:
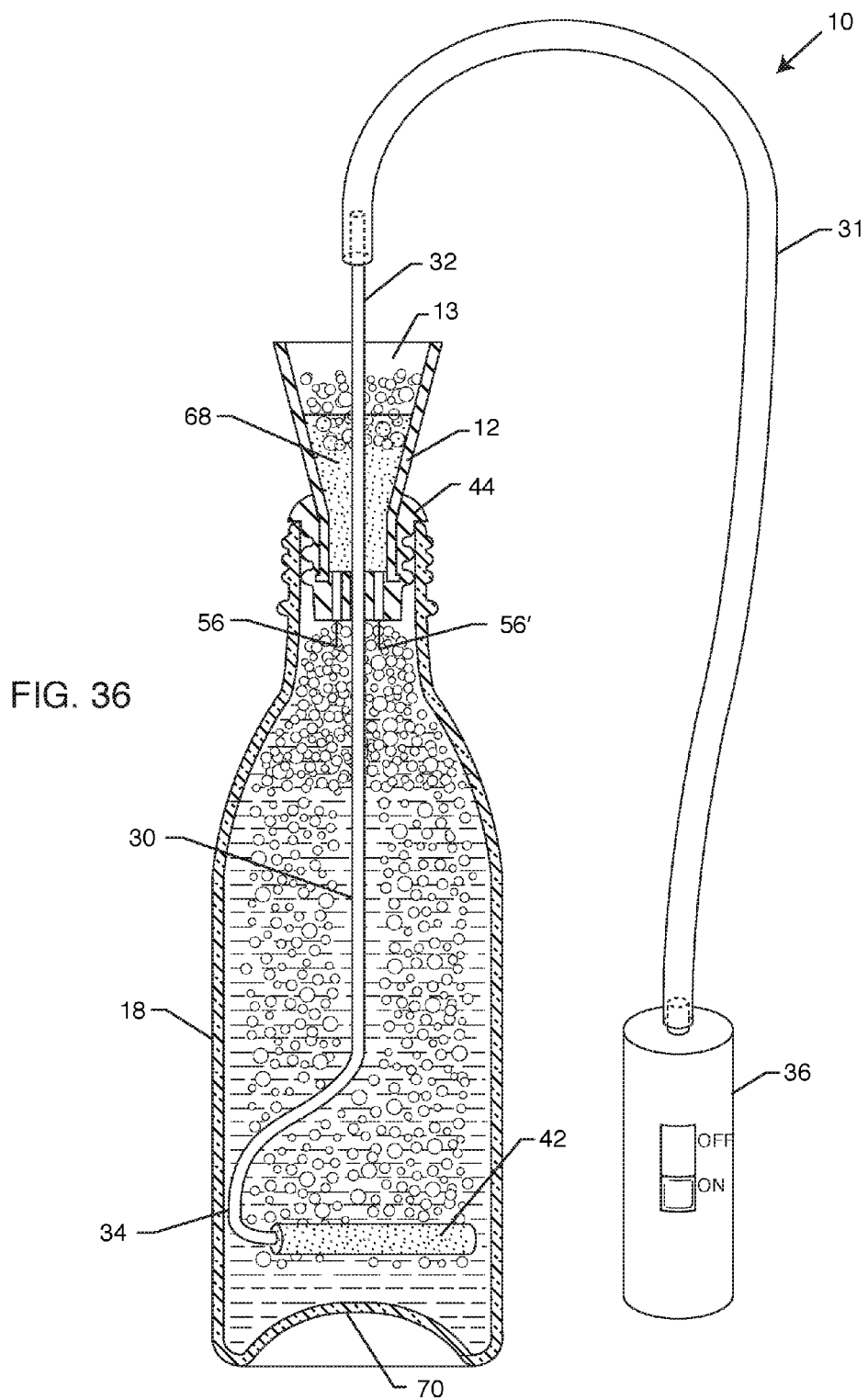
FIG. 36 is another embodiment of a wine aerator similar to FIG. 14, where now the distal end of the gas conduit is flexible and resilient such that it is shaped to dispose the bubble-generating element in a horizontal position for increased aeration.

FIG. 36 is another embodiment of a wine aerator similar to FIG. 14. Now, the distal end 34 of the gas conduit 30 is flexible and resilient but is also shaped to dispose the bubble-generating aeration element 42 in a horizontal position for increased aeration. The gas conduit 30 could be made of a memory-retention polymer, metal or the like, that could sufficiently flex when inserted into the narrowed opening of the wine bottle, but return to its preset shape such that it disposed the bubble-generating aeration element 42 in the horizontal position. Due to the flexibility of the gas conduit 30, it would take almost no more time to install and remove it from the bottle, but would provide a more efficient method of wine aeration. It is also understood by those skilled in the art that the bent distal end 34 could be used when the bubble-reducing filter element 68 is removed. In other words, the bent distal end 34 is not dependent upon the bubble-reducing filter element 68, but instead could be utilized in any of the embodiments disclosed throughout this specification.

Figure 37:
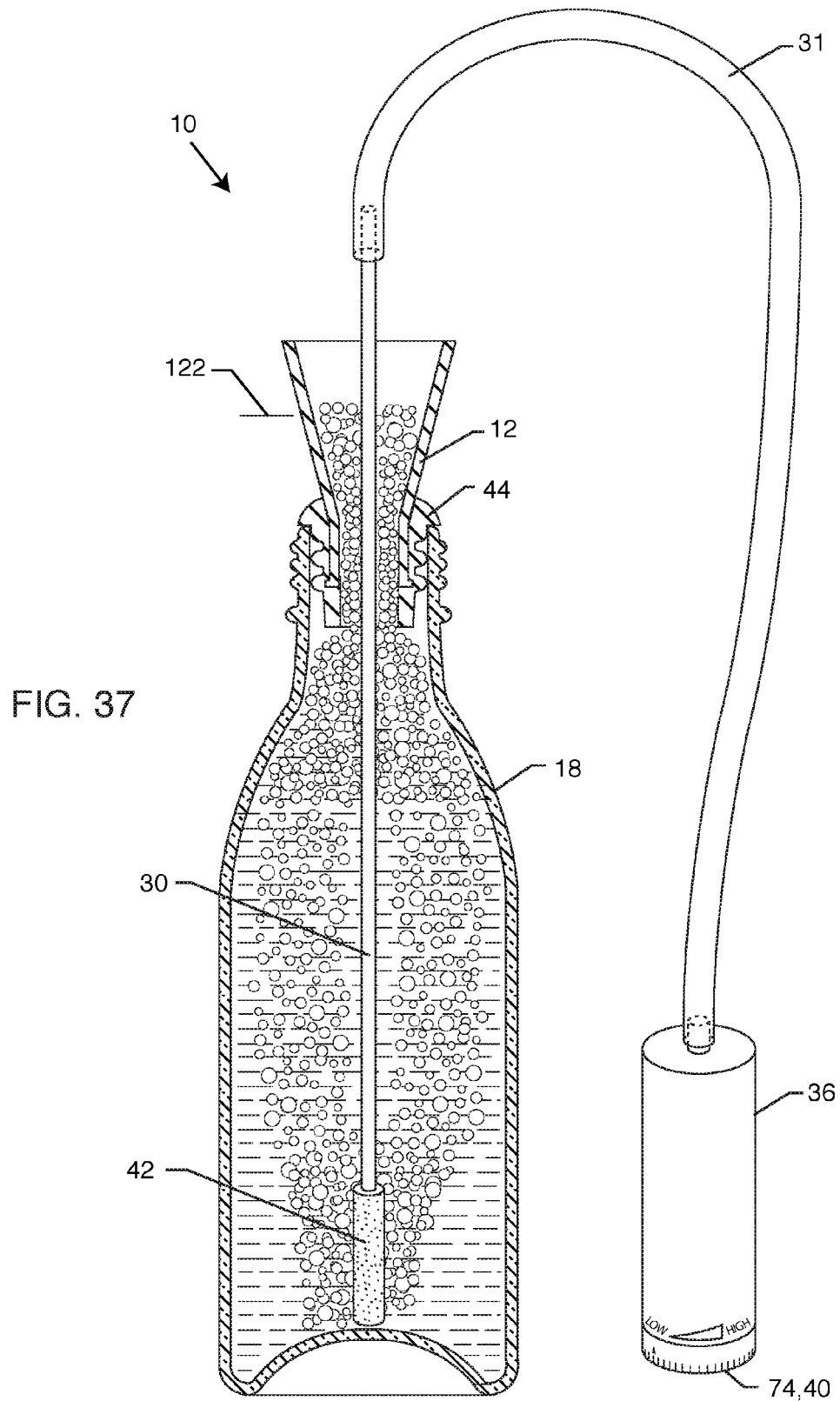
FIG. 37 is another embodiment of a wine aerator where now the expansion chamber and gas conduit can be separately manufactured and separately used depending on whether a glass or bottle is to be aerated.

FIG. 37 is very similar to the combination of FIG. 14 and FIG. 14C. Referring to FIG. 14, one can see that there is a filter element 68 that acts to break up bubbles; therefore, allowing the wine to be aerated at a relatively high flow rate. In FIG. 37, this filter element 68 has been removed. In addition, referring back to FIG. 14 in comparison with FIG. 37, one can see that the through holes 56 and 56' have been enlarged such that the gas conduit 30 is no longer affixed to the fluid expansion chamber 12. Referring once again to FIG. 37, the diameter of aeration element 42 has been carefully selected such that it will pass through the inside diameter of seal 44 and expansion chamber 12 such that the two elements may be separated and/or manufactured separately. This allows great flexibility in the present invention. For example, if one was going to aerate only a glass of wine, one could slide the aeration element 42 out of the retention chamber 12 thereby using only aeration element 42 to aerate the wine glass. On the other hand, if one was to aerate a full bottle of wine, one would first place the fluid retention chamber 12 and then slide the aeration element 42 down through the inside diameter of the fluid retention chamber, placing it on top of the wine bottle (or even midway down the wine bottle).

One can also see that the pump element 36 has been modified. In this case, it has a flow rate control knob 74 that incorporates the on/off switch 40. The control knob 74 could be either a rheostat or potentiometer, which then controls the motor speed. This switch 40 also, when you click it all the way to the lowest position, has an off position. You will feel this off position by a click that the user will feel and/or sense.

In actual experiments using a variable speed knob 74,40, the inventors have determined that it is relatively easy to start from a very low flow rate setting and gradually increase it until you see bubbles start to form and come up the retention chamber 12. One has to observe this carefully and then turn the flow rate down until one reaches a state of equilibrium. For example, an ideal state of equilibrium would be shown at line 122 across the expansion chamber 12, where one would see the last bubbles breaking and turning back into a liquid. Through simple experimentation, one could then determine how long one needs to hold this in an equilibrium state until the wine reaches the desired taste. The inventors have found that in general, this takes about 20 seconds for common Merlots. It will be appreciated that the variable flow rate switch, which incorporates an integral on/off switch, can be adapted to any of the previous figures or descriptions in the present invention. It is also understood by those skilled in the art, that any of the embodiments taught herein can be cross-applied to any other embodiment or figure taught herein.

A further refinement of the apparatus of FIG. 37 (not shown) is that the gas conduit 30 could be eliminated and rather the gas conduit extension 31 would be routed all the way from the pump 36 all the way directly to the proximal end of the bubble aeration element 42. This way when the tubing 31 becomes stained, discolored or even worn out, it can easily be replaced without the need to replace the more expensive pump or distal aeration element 42. This also leads to easy change outs of the distal aeration element 42.

For example, in a restaurant application where a very high use is anticipated, it may be desirable to change out just the distal aeration element 42 on a daily or weekly basis. In fact, in high end restaurants, the distal aeration element 42 would be changed after aerating each different type of wine. For example, if at one table, they bubble a Merlot, they would then go through the ritual of removing the aeration element 42 and then placing a new one to go on and bubble a Burgundy.

During initial prototype development, the inventors found that some of the aeration elements disintegrated in the presence of the wine over time. It was found that those aeration elements (polymer based stones) broke down due to the alcohol in the wine. It was also found out that certain grades of tubing became heavily stained by the wine. The inventors are hereby teaching that all of the elements that are in contact with wine, including any tubing, gas conduits and in particular, the aeration elements must be of FDA food grade materials, including materials that are resistant to solvents (such as alcohol), non-toxic and generally biocompatible. Furthermore, these materials will not break down over time while releasing binders or solvents or other chemicals into the wine. This not only preserves the taste of the wine, but also ensures consumer safety. As used herein, the term "food grade" includes all of the aforementioned elements.

Although several embodiments have been described in detail for purposes of illustration, various modifications may be made to each without departing from the scope and spirit of the invention. Accordingly, the invention is not to be limited, except as by the appended claims.

What is claimed is:

1. A wine aerator, comprising:
   a seal configured to engage an opening of an uncorked wine bottle separating an inside of the uncorked wine bottle from an outside of the uncorked wine bottle;
   a gas conduit having a proximal end in fluid communication with a distal end, wherein the gas conduit passes through the seal and wherein the distal end is configured to be insertable into the inside of the uncorked wine bottle;
   a gas source connectable to the proximal end of the gas conduit and in fluidic communication with the gas conduit, wherein the gas source comprises an air pump having an adjustable flow rate of at least 0.1 liters per minute up to a maximum of 20 liters per minute;
   a bubble-generating aeration element disposed at the distal end of the gas conduit and in fluidic communication with the gas conduit, wherein the bubble-generating aeration element comprises a porous material having an average pore size of at least 1 micron up to a maximum of 500 microns; and
   at least one aperture disposed through the seal, the at least one aperture configured to be in fluidic communication with the inside and outside of the uncorked wine bottle when the seal is engaged with the opening of the uncorked wine bottle.

2. The wine aerator of claim 1, wherein the average pore size of the bubble-generating aeration element is at least 5 microns up to a maximum of 200 microns.

3. The wine aerator of claim 1, wherein the average pore size of the bubble-generating aeration element is at least 10 microns up to a maximum of 100 microns.

4. The wine aerator of claim 1, wherein the air pump has an adjustable flow rate of at least 1 liters per minute up to a maximum of 10 liters per minute.

5. The wine aerator of claim 1, wherein the air pump has an adjustable flow rate of at least 1 liters per minute up to a maximum of 5 liters per minute.

6. The wine aerator of claim 1, wherein the porous material of the bubble-generating aeration element consists of a polymer.

7. The wine aerator of claim 6, wherein the polymer is polyethylene.

8. The wine aerator of claim 7, wherein the polyethylene comprises a food-grade, binder-free polyethylene.

9. The wine aerator of claim 1, wherein when the seal is engaged with the opening of the uncorked wine bottle the gas source is configured to provide a gas flow through the proximal end of the gas conduit, through the distal end of the gas conduit, through the bubble-generating aeration element, through the inside of the uncorked wine bottle and through the at least one aperture.

10. The wine aerator of claim 1, wherein the seal is configured to seal against an inside surface, a top surface and/or an outside surface of the opening of the uncorked wine bottle, and wherein the seal comprises an elastic or rubber-like material.

11. The wine aerator of claim 1, wherein the gas source comprises an electrically powered air pump.

12. The wine aerator of claim 11, wherein the electrically powered air pump is electrically powered by a battery and/or by an electrical plug.

13. The wine aerator of claim 11, wherein the electrically powered air pump comprises an electronic display and/or a LED display, where the electrically powered air pump comprises at least one button configured to control the electrically powered air pump.

14. The wine aerator of claim 1, wherein the gas source is disposed remote from the seal.

15. The wine aerator of claim 1, wherein the gas source is attached to a portion of the seal or wherein the gas source is attached to a housing that is then attached to the seal.

16. The wine aerator of claim 1, wherein the gas conduit comprises a bent distal end disposing the bubble-generating aeration element perpendicular to the proximal end of the gas conduit.

17. The wine aerator of claim 16, wherein the gas conduit comprises a resilient and flexible material preformed into the bent distal end.

18. The wine aerator of claim 1, wherein the gas conduit passes through the at least one aperture and the gas conduit is not attached to the at least one aperture.

19. The wine aerator of claim 1, including a housing attached to seal wherein the housing extends below the seal to a contoured distal end, wherein the gas conduit is configured to move within the housing and seal thereby extending the bubble-generating aeration element beyond the contoured distal end of the housing.

20. A wine aerator, comprising:
    a gas conduit having a proximal end in fluid communication with a distal end, wherein the distal end of the gas conduit is configured to pass through an opening of an uncorked wine bottle and be insertable into an inside of the uncorked wine bottle;
    a gas source connectable to the proximal end of the gas conduit and in fluidic communication with the gas conduit, wherein the gas source comprises an electrically powered air pump having an adjustable flow rate of at least 0.1 liters per minute up to a maximum of 20 liters per minute, wherein the electrically powered air pump is electrically powered by a battery and/or by an electrical plug;

a bubble-generating aeration element disposed at the distal end of the gas conduit and in fluidic communication with the gas conduit, wherein the bubble-generating aeration element comprises a porous material having an average pore size of at least 1 micron up to a maximum of 500 microns, wherein the porous material of the bubble-generating aeration element consists of a polymer;

a seal configured to engage the opening of the uncorked wine bottle separating the inside of the uncorked wine bottle from an outside of the uncorked wine bottle, wherein the gas conduit passes through the seal; and at least one aperture disposed through the seal, the at least one aperture configured to be in fluidic communication with the inside and outside of the uncorked wine bottle when the seal is engaged with the opening of the uncorked wine bottle.

* * * * *